United States Patent
Das et al.

(10) Patent No.: US 7,167,499 B2
(45) Date of Patent: Jan. 23, 2007

(54) VERY HIGH ENERGY, HIGH STABILITY GAS DISCHARGE LASER SURFACE TREATMENT SYSTEM

(75) Inventors: Palash P. Das, Vista, CA (US); Bruce E. Bolliger, San Diego, CA (US); Partiv S. Patel, San Diego, CA (US); Brian C. Klene, La Jolla, CA (US); Paul C. Melcher, El Cajon, CA (US); Robert B. Saethre, San Diego, CA (US)

(73) Assignee: TCZ PTE. Ltd., Singapore (SG)

( * ) Notice: Subject to any disclaimer, the term of this patent is extended or adjusted under 35 U.S.C. 154(b) by 164 days.

(21) Appl. No.: 10/781,251

(22) Filed: Feb. 18, 2004

(65) Prior Publication Data

US 2004/0182838 A1 Sep. 23, 2004

Related U.S. Application Data

(63) Continuation-in-part of application No. 10/722,992, filed on Nov. 26, 2003, now abandoned, which is a continuation-in-part of application No. 10/631,349, filed on Jul. 30, 2003, now Pat. No. 7,039,086, which is a continuation-in-part of application No. 10/233,253, filed on Aug. 30, 2002, now Pat. No. 6,704,339, which is a continuation-in-part of application No. 10/012,002, filed on Nov. 30, 2001, now Pat. No. 6,625,191, which is a continuation-in-part of application No. 09/943,343, filed on Aug. 29, 2001, now Pat. No. 6,567,450, which is a continuation-in-part of application No. 09/837,035, filed on Apr. 18, 2001, now Pat. No. 6,618,421.

(51) Int. Cl.
*H01S 3/22* (2006.01)
*H01S 3/03* (2006.01)

(52) U.S. Cl. .......................................... 372/55; 372/61
(58) Field of Classification Search ................. 372/55, 372/61
See application file for complete search history.

(56) References Cited

U.S. PATENT DOCUMENTS

| | | | |
|---|---|---|---|
| 4,223,279 A | 9/1980 | Bradford, Jr. et al. | 331/94.5 |
| 4,455,658 A | 6/1984 | Sutter, Jr. | 372/38 |
| 4,618,759 A | 10/1986 | Muller et al. | 219/121 |
| 4,959,840 A | 9/1990 | Akins et al. | 372/57 |
| 5,023,884 A | 6/1991 | Akins et al. | 372/57 |
| 5,025,445 A | 6/1991 | Anderson et al. | 372/20 |
| 5,025,446 A | 6/1991 | Kuizenga | 372/21 |
| 5,189,678 A | 2/1993 | Ball et al. | 372/28 |
| 5,313,481 A | 5/1994 | Cook et al. | 372/37 |
| 5,315,611 A | 5/1994 | Ball et al. | 372/56 |
| 5,329,398 A * | 7/1994 | Lai et al. | 359/566 |
| 5,359,620 A | 10/1994 | Akins | 372/58 |
| 5,448,580 A | 9/1995 | Birx et al. | 372/38 |
| 5,471,965 A | 12/1995 | Kapich | 123/565 |
| 5,852,621 A | 12/1998 | Sandstrom | 372/25 |
| 5,863,017 A | 1/1999 | Larson et al. | 248/176.1 |
| 5,953,360 A | 9/1999 | Vitruk et al. | 372/87 |
| 5,978,394 A | 11/1999 | Newman et al. | 372/32 |
| 5,991,324 A * | 11/1999 | Knowles et al. | 372/57 |
| 6,005,879 A | 12/1999 | Sandstrom et al. | 372/25 |
| 6,016,325 A | 1/2000 | Ness et al. | 372/38 |
| 6,018,537 A | 1/2000 | Hofmann et al. | 372/25 |
| 6,028,880 A | 2/2000 | Carlesi et al. | 372/58 |
| 6,067,306 A | 5/2000 | Sandstrom et al. | 372/38 |
| 6,067,311 A | 5/2000 | Morton et al. | 372/57 |
| 6,094,448 A | 7/2000 | Fomenkov et al. | 372/102 |
| 6,104,735 A | 8/2000 | Webb | 372/37 |
| 6,128,323 A | 10/2000 | Myers et al. | 372/38 |
| 6,143,661 A * | 11/2000 | Kousai et al. | 438/689 |
| 6,151,349 A | 11/2000 | Gong et al. | 372/58 |
| 6,164,116 A | 12/2000 | Rice et al. | 73/1.72 |
| 6,192,064 B1 | 2/2001 | Algots et al. | 372/99 |
| 6,208,674 B1 | 3/2001 | Webb et al. | 372/57 |
| 6,208,675 B1 | 3/2001 | Webb | 372/58 |
| 6,212,211 B1 | 4/2001 | Azzola et al. | 372/33 |
| 6,219,368 B1 | 4/2001 | Govorkov | 372/59 |
| 6,240,117 B1 | 5/2001 | Gong et al. | 372/58 |
| 6,317,447 B1 | 11/2001 | Partlo et al. | 372/57 |
| 6,330,261 B1 | 12/2001 | Ishihara et al. | 372/38.1 |
| 6,414,979 B1 | 7/2002 | Ujazdowski et al. | 372/87 |

| | | |
|---|---|---|
| 6,477,193 B1 | 11/2002 | Oliver et al. ............. 372/58 |
| 6,549,551 B1 | 4/2003 | Ness et al. ............. 372/38 |
| 6,567,450 B1 | 5/2003 | Myers et al. ............. 372/55 |
| 6,618,421 B1 | 9/2003 | Das et al. ............. 372/55 |
| 6,625,191 B1 | 9/2003 | Knowles et al. ............. 372/55 |
| 2001/0050931 A1* | 12/2001 | Iso ............. 372/25 |
| 2002/0021728 A1 | 2/2002 | Newman et al. ............. 372/55 |
| 2002/0167986 A1 | 11/2002 | Pan et al. ............. 372/55 |
| 2003/0099269 A1 | 5/2003 | Ershov et al. ............. 372/55 |
| 2004/0022293 A1 | 2/2004 | Rule et al. ............. 372/58 |

OTHER PUBLICATIONS

U.S. Appl. No. 09/451,995, filed Nov. 30, 1999, Hofmann et al.
U.S. Appl. No. 10/606,412, filed Jun. 25, 2003, Saethre et al.
U.S. Appl. No. 10/607,407, filed Jun. 25, 2003, Ness et al.
U.S. Appl. No. 10/712,545, filed Nov. 13, 2003, Webb et al.
Dassow, et al., "$YVO_4$ Laser Crystallization for Thin Film Transistors with a High Mobility," Mat. Res. Soc. Sympo., Proc. vol. 621, pp. 9.3.1-9.3.6, (2000).
Kudo, et al., "Advanced Lateral Crystal Growth of a Si Thin Films by Double-Pulsed Irradiation of All Solid-State Lasers," Mat. Res. Soc. Symp. Proc. vol. 762, pp. A16.5.1-A16.5.6, (2003).
Voutsas, A.T., "A New Era of Crystallization: Advances in Polysilicon Crystallization and Crystal Engineering," Applied Surface Science, 208-209, pp. 250-262, (2003).
Wexler, et al., "Use of XeCl Amplifiers for Degenerate Four Wave Mixing", American Institute of Physics, Excimer Lasers—1983, C. Rhodes, et al. Editors, pp. 165-171, (1983).
Yres, J., et al., "Low Temperature Poly-Si for Liquid Crystal Display Addressing," Philips Research Laboratories, Surrey, England, (May 11, 1993); http://www.atip.org/ATIP/public/atip.reports.93/mita-1cd.93.html.

* cited by examiner

*Primary Examiner*—Minsun Oh Harvey
*Assistant Examiner*—Rory Finneren
(74) *Attorney, Agent, or Firm*—Baker & McKenzie LLP

(57) ABSTRACT

A gas discharge laser crystallization apparatus and method for performing a transformation of a crystal makeup or orientation in the substrate of a workpiece is disclosed which may comprise, a multichamber laser system comprising, a first laser unit comprising, a first and second gas discharge chamber; each with a pair of elongated spaced apart opposing electrodes contained within the chamber, forming an elongated gas discharge region; a laser gas contained within the chamber comprising a halogen and a noble gas selected to produce laser light at a center wavelength optimized to the crystallization process to be earned out on the workpiece; a power supply module comprising, a DC power source; a first and a second pulse compression and voltage step up circuit connected to the DC power source and connected to the respective electrodes, comprising a multistage fractional step up transformer having a plurality of primary windings connected in series and a single secondary winding passing through each of the plurality of primary windings, and a solid state trigger switch; and a laser timing and control module operative to time the closing of the respective solid state switch based upon operating parameters of the respective first and second pulse compression and voltage step up circuit to effect operation of the first and second laser units as either a POPA configured laser system or a POPO configured laser system to produce a single output laser light pulse beam. As a POPA laser system relay optics may be operative to direct a first output laser light pulse beam from the first laser unit into the second gas discharge chamber; and, the timing and control module operates to create a gas discharge between the second pair of electrodes while the first output laser light pulse beam is transiting the second discharge region, within plus or minus 3 ns and as a POPO, combining optics combine the output beams, and timing creates pulse separation in the combined output a preselected time plus or minus 3 ns.

54 Claims, 9 Drawing Sheets

VERY HIGH ENERGY, HIGH STABILITY GAS DISCHARGE LASER SURFACE TREATMENT SYSTEM

RELATED APPLICATIONS

This application is a continuation-in-part of U.S. application Ser. No. 10/722,992 entitled VERY HIGH ENERGY, HIGH STABILITY GAS DISCHAREGE LASER SURFACE TREATMENT SYSTEM, filed Nov. 26, 2003 now abandoned; of Ser. No. 10/631,349, entitled CONTROL SYSTEM FOR TWO CHAMBER GAS DISCHARGE LASER, filed Jul. 30, 2003 now U.S. Pat. No. 7,039,086; of Ser. No. 10/233,253, entitled LITHOGRAPHY LASER WITH BEAM DELIVERY AND BEAM POINTING CONTROL, filed on Aug. 30, 2002 now U.S. Pat. No. 6,704,339; of Ser. No. 10/012,002, now U.S. Pat. No. 6,625,191, filed on Nov. 30, 2001, entitled VERY NARROW BAND, TWO CHAMBER, HIGH REP RATE GAS DISCHARGE LASER SYSTEM, with inventors Knowles, et al., published on Oct. 24, 2002, Pub. No. US20020154668A1; Ser. No. 09/943,343, now U.S. Pat. No. 6,567,450, filed on Aug. 29, 2001, entitled VERY NARROW BAND, TWO CHAMBER, HIGH REP RATE GAS DISCHARGE LASER SYSTEM, with inventors Myers et al., published on Apr. 18, 2002, Pub. No. US20020044586A1; U.S. application Ser. No. 09/837,035, now U.S. Pat. No. 6,618,421, filed on Apr. 18, 2001, entitled HIGH REPETITION RATE GAS DISCHARGE LASER WITH PRECISE PULSE TIMING CONTROL, with inventors Das et al., published on Jan. 31, 2002, Publication No. US/20020012376A1; and the disclosures of all of which are hereby incorporated by reference.

The present application is related to an application Ser. No. 10/607,407, METHOD AND APPARATUS FOR COOLING MAGNETIC CIRCUIT ELEMENTS, filed on Jun. 25, 2003, and to an application Ser. No. 10/606,412, entitled METHOD AND APPARATUS FOR ELECTRICALLY INTERCONNECTING HIGH VOLTAGE MODULES POSITIONED IN RELATIVELY CLOSE PROXIMITY, also filed on Jun. 25, 2003, application Ser. No. 10/036,727, entitled TIMING CONTROL FOR TWO-CHAMBER GAS DISCHARGE LASER SYSTEM, filed on Dec. 21, 2001, and to application Ser. No. 10/141,201, entitled GAS DISCHARGE ULTRAVIOLET LASER WITH ENCLOSED BEAM PATH WITH ADDED OXIDIZER, filed on May 7, 2002, and to application Ser. No. 10/356,168, entitled AUTOMATIC GAS CONTROL SYSTEM FOR A GAS DISCHARGE LASER, filed on Jan. 31, 2003, and to Ser. No. 09/848,043, filed on May 3, 2001, entitled INJECTION SEEDED LASER WITH PRECISE TIMING CONTROL, with inventors Ness, et al., published on Jul. 4, 2002, Pub. No. 20020085606, and to Ser. No. 10/141,201, entitled GAS DISCHARGE ULTRAVIOLET LASER WITH ENCLOSED BEAM PATH WITH ADDED OXIDIZER, filed on May 7, 2002, with inventors Pan, et al., published on Nov. 14, 2002, Pub. No. US20020167986A1, and to Ser. No. 10/036,727, filed on Dec. 21, 2001, entitled TIMING CONTROL FOR TWO-CHAMBER GAS DISCHARGE LASER SYSTEM, with inventors Ershov, et al., published on May 29, 2003, Pub. No. US20020099269A1, and to Ser. No. 10/012,002, entitled VERY NARROW BAND, TWO CHAMBER, HIGH REP RATE GAS DISCHARGE LASER SYSTEM, filed on Nov. 30, 2001, now U.S. Pat. No. 6,625,191, and to application Ser. No. 09/837,035, entitled HIGH REPETITION RATE GAS DISCHARGE LASER WITH PRECISE PULSE TIMING CONTROL, filed on Apr. 18, 2001, now U.S. Pat. No. 6,619,421, and U.S. Pat. No. 6,016,325, entitled MAGNETIC MODULATOR VOLTAGE AND TEMPERATURE TIMING COMPENSATION CIRCUIT, and U.S. Pat. No. 6,067,306, entitled LASER-ILLUMINATED STEPPER OR SCANNER WITH ENERGY SENSOR FEEDBACK, issued to Sandstrom et al. on May 23, 2000, and to U.S. application Ser. No. 09/451,995, entitled LONG-PULSE PULSE POWER SYSTEM FOR GAS DISCHARGE LASER, filed on Nov. 30, 1999. U.S. Application entitled LONG DELAY AND HIGH TIS PULSE STRETCHER, filed on Nov. 13, 2003, and to U.S. patent application Ser. No. 09/854,097, entitled FOUR KHZ GAS DISCHARGE LASER, filed on May 11, 2001, and to U.S. Pat. No. 6,128,323, entitled, RELIABLE, MODULAR PRODUCTION QUALITY NARROW-BAND HIGH REP RATE EXCIMER LASER, and to U.S. Pat. No. 6,067,311, entitled EXCIMER LASER WITH PULSE MULTIPLEXER, the disclosures of all of which are hereby incorporated by reference.

FIELD OF THE INVENTION

The present invention relates to high power and high stability gas discharge lasers for use in manufacturing processes involving treatment of surfaces and/or substrates with laser light over large areas and at high repetition rates.

BACKGROUND OF THE INVENTION

Thin-film transistors ("TFTs") is a well known technology for building, e.g., liquid crystal diode ("LCD") screens that are commonly found, e.g., on laptop computers. Polycrystaline silicon (Poly-Si) TFT screens are brighter and more readable than, e.g., amorphous silicon (aSi) TFT LCD screens, but can consume more power and can be generally more expensive, in part due to currently available manufacturing techniques, an in particular, e.g., impacts on manufacturing yields due to certain limitations in the currently available manufacturing technologies.

Annealing of the outer surfaces of the aSi LCD substrates is currently a critical process, both from a panel display performance perspective and in relation to attainable manufacturing yields. It is well known to use TFT-annealing, e.g., for the production of high resolution flat panel displays. It is also well known to utilize lasers, e.g., excimer or molecular gas discharge lasers, e.g., to cause laser-induced crystallization of amorphous silicon (A-Si) to produce, e.g., polycrystalline silicon (Poly-Si). This process, and its very accurate control and operation is a pivotal technology for the next generation of TFT devices. Without such technology apparatus, e.g., flat panel displays, will be prevented from offering such things as the required excellent resolution and brightness, large angle of view and high pixel refresh rates that the display technology is demanding as the technology moves forward.

Poly-Si TFT technology represents an important route for the future development of flat panel displays by enabling the integration of addressing and clocking circuitry onto the active plate. Two technologies have emerged to do this: either by local laser annealing in the circuit areas or by a monolithic approach using Poly-Si for the array and the circuit TFTS. J. Yres et al., "Low Temperature Poly-Si For Liquid Crystal Display Addressing" Philips Research Laboratories, Surrey, England, ASIAN TECHNOLOGY INFORMATION PROGRAM (ATIP) 11 May 1993 (http://www.atip.org/ATIP/public/atip.reports.93/mita-lcd.93.html).

It is also well known to select laser light output from currently available light source systems that has a center wavelength that is optimized to the process involved, e.g., in the case of annealing, to maximize the penetration of the light into the surface of the material being treated, e.g., annealed, and at sufficiently high power incident on the surface to, e.g., effect annealing as deeply as necessary into the material. In other cases, the particular material being treated may also respond to the treatment, e.g., annealing, differently at different center wavelengths influencing the selection of the particular center wavelength.

Gas discharge lasers known in the art are not available for providing an infinite spectrum of center wavelengths due to the physical and chemical reactions taking place in the within any particular lasing chamber being dictated by the gas(es) being used in the gas discharge.

It is currently also well known that excimer or other gas discharge lasers, particularly Xenon Chloride (XeCl) halogen gas discharge lasers are useful for the type of annealing processes noted above. Companies such as Lambda-Physik of Germany supply products such as the Lambda-Physik "STEEL 2000" having operating parameters of:

| | |
|---|---|
| Wavelength | 308 nm |
| Stabilized Energy | 1030 mJ |
| Stabilized Average Power | 310 W (at 308 nm) |
| Max. Repetition Rate | 300 Hz |
| Pulse Duration (typ., FWHM) | 29 ± 5 ns |
| Pulse to Pulse Energy Stability (3 sigma) | ≦5.4% |
| Max. Pulse Energy Deviation Above Average - (Max. Energy minus Avg. Energy) | ≦8.5% |
| Beam Dimensions (typ., FWHM) (1 m from beam exit) | (40 ± 3) × (13 ± 2) mm2 |
| Beam Divergence (typ., FWHM) (at 10 Hz) | ≦4.5 × ≦1.5 mrad |
| Angular Pointing Stability (typ. FWHM) (1 m from beam exit) | ≦0.45 × ≦0.15 mrad |
| Gas Lifetime | >40 × $10^6$ pulses |
| Expected Laser Tube Lifetime | 1 × $10^9$ pulses |
| Beam Height | 1235 ± 20 mm |

Such a laser, e.g., with about 1 J and 300 Hz performance, is just about at the edge of the performance requirements for current generation glass substrates. The next generation (the $5^{th}$) of such glass substrates of 1250 mm×1100 mm will require much better performance, e.g., higher laser energies higher repetition rates, while maintaining such parameters as pulse stability, beam properties, etc. As the requirements become more stringent due, e.g., to advancing flat panel display technology, e.g., glass substrates increasing in size to, e.g., 1250 mm×1100 mm, e.g., the laser energies required will increase at least by a factor of two, to 2 J/pulse. An approach suggested by some, e.g., Lambda Physik is to combine 2 lasers, e.g., with a beam homogenizer to combine the two beams from the two lasers. However, the use of 2 lasers, e.g., due to the addition of the homogenizer alone, increases costs, also adding to costs of consumables and to increased maintenance downtime. The associated delivery optics, in addition to the homogenizer also becomes more complex.

Use of POPA configurations for certain applications is well known, as discussed, e.g., in B. Wexler, et al, "Use of XeCl amplifiers for degenerate four-wave mixing", American Institute of Physics, Excimer Lasers—1983, C. Rhodes et al. Eds., pp 172–176. In 1986, an excimer laser company, Questek, based in Billerica, Mass., introduced a 100 W KrF laser based on POPA technology. However, the product was immediately withdrawn from the market due to lack of jitter/timing control technology, due in part to the fact that the PO and PA were thyratron switched.

There is, therefore a need for a better solution to the increasing demands of surface and materials treatment technology using laser light, e.g., for TFT annealing and/or creation of, e.g., poly-si on large scales from an A-Si coating.

SUMMARY OF THE INVENTION

A gas discharge laser crystallization apparatus and method for performing a transformation of a crystal makeup or orientation in the substrate of a workpiece is disclosed which may comprise, a multichamber laser system comprising, a first laser unit comprising, a first and second gas discharge chamber; each with a pair of elongated spaced apart opposing electrodes contained within the chamber, forming an elongated gas discharge region; a laser gas contained within the chamber comprising a halogen and a noble gas selected to produce laser light at a center wavelength optimized to the crystallization process to be carried out on the workpiece; a power supply module comprising, a DC power source; a first and a second pulse compression and voltage step up circuit connected to the DC power source and connected to the respective electrodes, comprising a multistage fractional step up transformer having a plurality of primary windings connected in series and a single secondary winding passing through each of the plurality of primary windings, and a solid state trigger switch; and a laser timing and control module operative to time the closing of the respective solid state switch based upon operating parameters of the respective first and second pulse compression and voltage step up circuit to effect operation of the first and second laser units as either a POPA configured laser system or a POPO configured laser system to produce a single output laser light pulse beam. As a POPA laser system relay optics may be operative to direct a first output laser light pulse beam from the first laser unit into the second gas discharge chamber; and, the timing and control module operates to create a gas discharge between the second pair of electrodes while the first output laser light pulse beam is transiting the second discharge region, within plus or minus 3 ns and as a POPO, combining optics combine the output beams, and timing creates pulse separation in the combined output a preselected time plus or minus 3 ns. A beam delivery unit and a pulse stretcher may be included, and timing and control may be processor controlled based on signals representing charging voltage and component temperatures in the pulse compression and voltage step up circuits.

DETAILED DESCRIPTION OF PREFERRED EMBODIMENTS

Figure 1A:
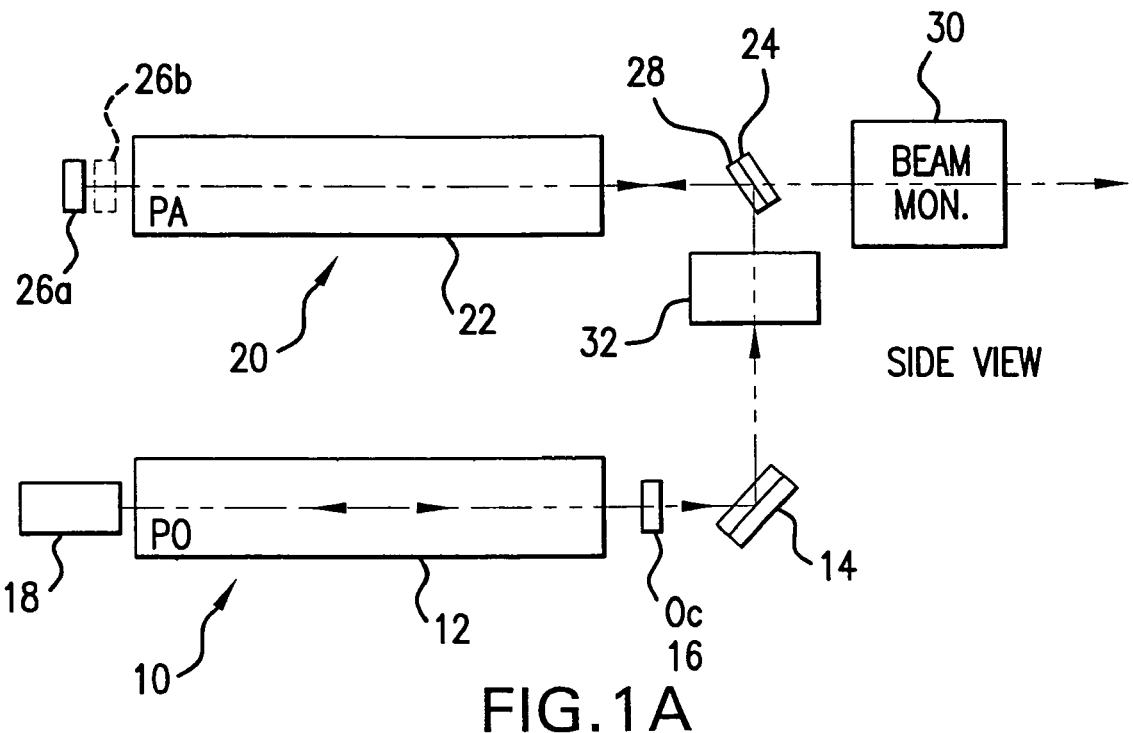
FIGS. 1A and 1B shows a side view and a top view of a block diagram partially schematic view of a multi-chambered laser system according to an embodiment of the present invention.

The present invention contemplates extending Applicants assignee's existing fluoride-based excimer technology to, e.g., XeCl lasers, e.g., for surface and material treatment applications. In particular, e.g., such a laser can be used to advance the capabilities of existing systems for large area annealing, e.g., of flat panel displays (TFT annealing), e.g., the Lambda-Physik XeCl laser (1 J, 300 Hz) noted above.

As contemplated by the present invention a high power, high energy XeCl laser is disclosed that can be optimized, e.g., for large area annealing, e.g., of $5^{th}$ generation glass panels, e.g., for flat panel displays. Also provides according to the present invention is a high efficiency beam delivery unit that can, e.g., deliver constant fluence, e.g., in the form of an elongated slit, several hundred millimeters long and a fraction of a millimeter wide, e.g. 370 mm×0.4 mm.

Based on roadmaps for glass substrates, the substrate sizes would increase to 1250 mm×1100 mm. This would drive up the laser energy and power requirements by a factor of two, to 2 J/pulse. The approach suggested by Lambda Physik is to combine 2 lasers as shown below. However, use of 2 lasers increases costs of consumables and downtime. The associated delivery optics also becomes more complex. According to an embodiment of the present invention applicants contemplate utilization of embodiments of the present invention, e.g., at this node—a 2 J/pulse 300 Hz laser, i.e., about 600 w.

According to Applicants' evaluations and discovery, a single commercially practical laser oscillator based design cannot produce 2 J/pulse due to the requirements for a very large discharge volume between the electrodes of the gas discharge type laser. For example, the Energy/Pressure ("E/P") ratio for XeCl lasers is approximately 1 kV/cm-atm. Even with very high voltages that Applicants assignee's pulse power systems are capable of delivering today, e.g., around 30 kV, one may only consider a discharge gap of around 3.5 cm at 4 atmosphere total pressure. Such a discharge gap, with a typical discharge width of 2 cm, would require the chamber electrodes to be about 1.4 m long, as opposed to electrodes of a little less that one meter long currently commonly used. The 1.4 meter length is not feasible for at least two reasons (1) the need for an impractically long chamber length that would, e.g., cause problems with chamber structure at high pressures and probably lead to tangential blower requirements and performance issues and (2) for the estimated small signal gain of 0.06/cm, this length is very close to the maximum of 1.7 m beyond which the laser is super-radiant, i.e., the amplified spontaneous emissions ("ASE") would be high enough to cause problems, e.g., loss of efficiency due to very broadband ASE outside of the natural, e.g., XeCl bandwidth around the center wavelength of about 308 nm.

The present invention contemplates a multi-chambered laser system configured to deliver the laser output of one chamber as a seed beam to the second chamber. Currently applicants' assignee provides a product line called the "XL" platform with the first chamber operating as a very highly line narrowed master oscillator, which sacrifices a great deal of output power to achieve the very narrow line narrowing, e.g., for delivery of essentially monochromatic light, e.g., for integrated circuit lithography uses. This low power line narrowed laser output of the oscillator, referred to as the maser oscillator ("MO") is then highly amplified in the second gas discharge laser chamber operating as a power oscillator ("PA").

The present invention contemplates the two chambered laser system being configured in a power oscillator power amplifier configuration (POPA). According to an embodiment of the present invention the two chambers may each have a 3.5 cm electrode gap between elongated electrodes of about 1 m in length. Such a power oscillator could produce 0.5 J to 0.7 J. This can, e.g., then be enough to saturate the amplifier (typical saturation intensities are around 100 mJ/cm2 for a 100 ns pulse). The PO efficiency would be around 2%, which is typical. The limiting factor for efficiency, according to an embodiment of the present invention is the conversion efficiency of the excimer molecules or, e.g., molecular fluorine molecules, to laser photons. Approximately 50% of the excited dimmers are lost to fluorescence before energy is extracted out of the laser.

However, according to an embodiment of the present invention in the proposed POPA scheme, the PA extraction efficiency can be much higher than 2% if operated as a stand-alone oscillator, i.e., as a POPO system. Applicants believe also that the efficiency of the PA could be up to and above about 4%. Thus, a 35 J of electrical input to the PO, and a 35 J laser light output of the PO to the PA, can be expected to deliver an output of the laser system as a whole at around 2 J, which translates to an efficiency requirement of only 2.9%. A comparable 2 J single oscillator system would need 100 J of energy per electrical pulse to the gas discharge electrodes.

This output of 2 J per pulse can now be efficiently coupled into a beam delivery unit without the associated losses and complexity of a beam mixer as proposed by others.

The same POPA concept can be applied, e.g., to lower energy pulse systems. In another configuration, the input energy to the PO and P'"A could be 4 J/pulse. At, e.g., a 2.9% overall efficiency, the output could be at or near 250 mJ per pulse at a much higher repetition rate, e.g., 4 KHz, which would still result in a 1 kW laser suitable, e.g., for the above noted applications. The ability according to embodiments of the present invention to control very precisely the timing etween the pulses in the separate chambers also raises the possibility according to an embodiment of the present invention to operate the laser in a double pulse mode at around 8 KHz. On such a mode, the PA can be a PO also and the staggered pulses from each PO optically combined in a single output path as described more fully below. Two pulses separated, by, e.g., 850 ns and with long duration pulses can be used to advantageously create, e.g., p-Si crystal growth advanced mobility and uniformity, as discussed in T. Kudo, et al., "Advanced Lateral Crystal Growth of a-Si Thin Film by Double Pulsed Irradiation of all Solid-State Lasers," Mat. Res. Soc. Symp. Proceedings, Vol. 762, Spring 2003, pp 1–6. Others have stated that prior excimer lasers lacked certain performance characteristics to be effectively or efficiently used in such processes, e.g., TFT annealing, due, e.g., to low energy density and/or pulse repetition rate and/or pulse stability, e.g., as discussed in A. Voutsas, "a New Era of Crystallization: Advances in Polysilicon Crystalization and Crystal Engineering," Applied Surface Science (2003), and R. Dassow, Nd:YVO$_4$ Laser Crystallization for Thin Film Transistors with a High Mobility," Mat. Res. soc. Symp. Proceedings, Vol 762, Spring 2000. Contemplated approaches suggested by the above, e.g., include double pulsed diode pumped solid state lasers, e.g., frequency doubled from a green laser at 532 nm. such solutions, however, are not likely to be able to meet the requirements going forward.

Excimer lasers according to embodiments of the present invention, however, can be configured to deliver mush higher power and energy, stabilized pulse to pulse and including staggered pulses very precisely timed and separated and also pulse elongated.

Therefore, according to an embodiment of the present invention it is proposed by Applicants to provide, e.g., a XeCl POPA based on applicants' assignee's MOPA architecture as implemented in applicant's assignee's XL product line. This XeCl laser, according to an embodiment of the present invention would be a broadband (i.e., the natural spectrum of a XeCl excimer laser with no line narrowing). Therefore, according to an embodiment of the present invention, the line-narrowing module and the wavelength and linewidth measuring equipment in, e.g., in applicants' assignee's XLA product line, would not be required, with consequent savings both in cost and overall efficiency.

Figure 1B:
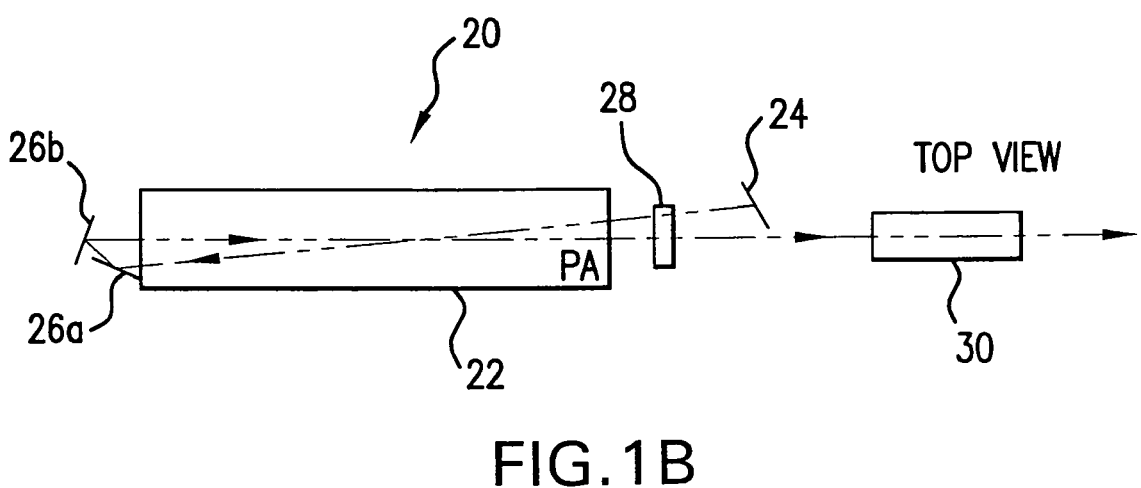

The MO in XLA would be replaced by a PO 10, which, as shown in FIGS. 1A and 1B consists of the PO 10 including a chamber 12, a total reflecting optic 14, e.g., a total reflecting mirror 18, instead of a line narrowing module, and an output coupler 16, all together forming a resonance cavity for the PO 10. The laser output light beam from the PO, according to an embodiment of the present invention, can then be double passed through the chamber 22 of the PA 20 to extract all the energy from the PA 20. The output of the PO 10 is reflected by totally reflecting mirror 14 to an offset mirror 24 which reflects the beam into the PA along a path misaligned with the elongated electrodes (not shown) in the PA 20 to a pair of totally reflecting mirrors 25*a* and 26*b* (or a total internal reflection prism, not shown) to create the second pass of the beam through the PA 20 along the centerline axis of the electrodes (not shown) in the chamber 22, which is also the optical axis of the output of the PA 20, through the output coupler 28 of the PA 20. Energy sensors 30, 32, respectively, at the output of PO 10 and PA 20, according to an embodiment of the present invention can monitor, e.g., the POPA output energy.

The applicants' assignee's XLA product line has all of the technology necessary support, e.g., the operation, e.g., of such a XeCl laser at high repetition rates, including well above 300 Hz. This supports the ability to deliver the high output energies required in the form of very high energy laser system light output pulses as very high repetition rates. These support technologies include a very efficient solid state pulse power system module ("SSPPM"); a very jitter free operation due to jitter-control technology to maintain, e.g., the critical relative timing between the firing of the electrical pulses to the elongated gas discharge electrodes, respectively, in the PO and PA, water-cooled modules and a very high-speed controller. Hence the proposed POPA would be high power light source, e.g., at 2 J per pulse, the rep-rate, according to an embodiment of the present invention can be around 500 Hz, or a 0.25 J per pulse, at 4 Khz, i.e., in either event a 1000 W laser.

Figure 2:
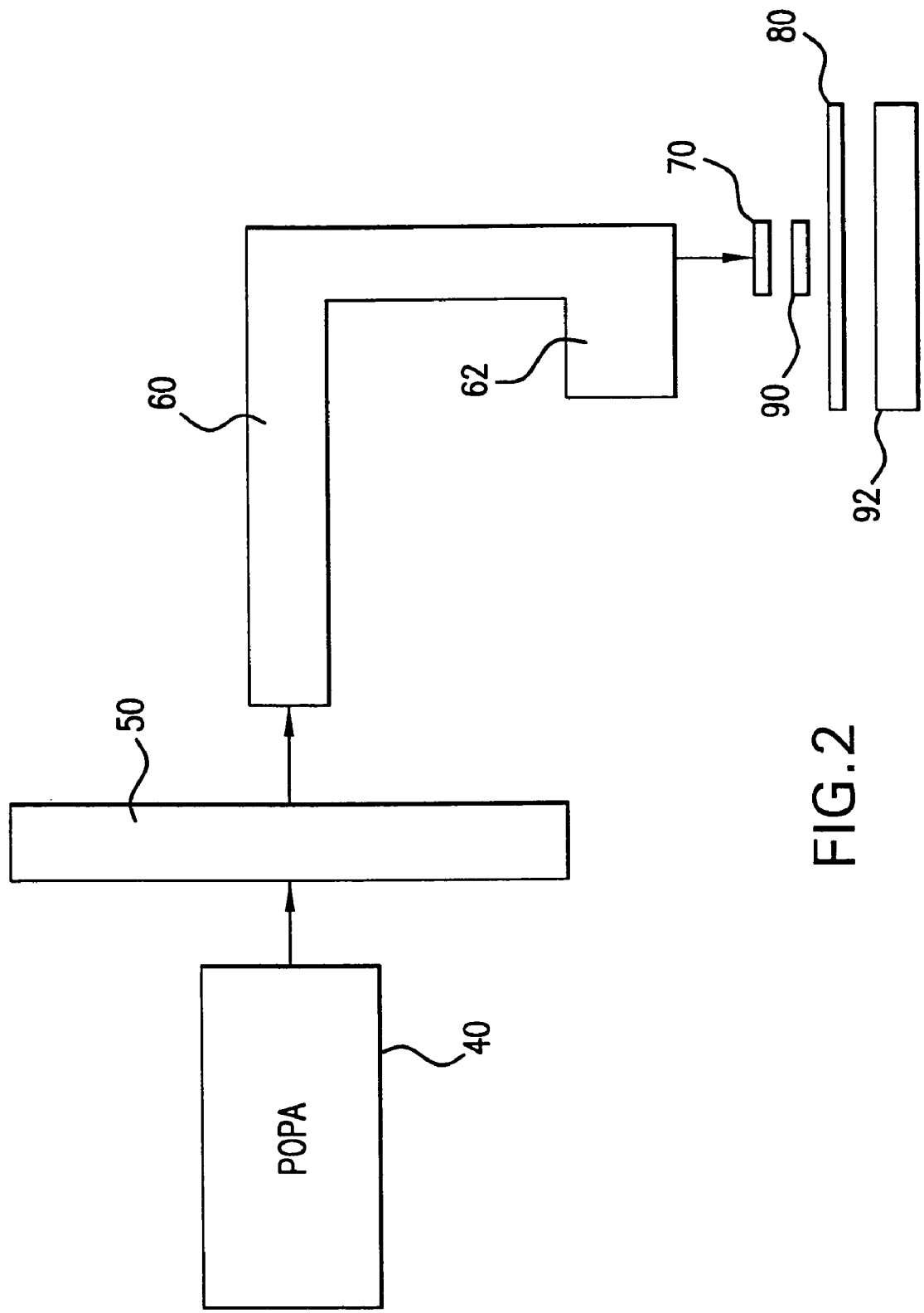
FIG. 2 shows a block diagrammatic schematic view of an embodiment of the present invention.

Turning now to FIG. 2, there is shown a block diagramatic schematic view of a surface/substrate treatment system according to an The output of the POPA 40 could, e.g., then be pulse stretched in a pulse stretcher 50, if required, either within or prior to delivery of the laser system output light beam to a beam delivery unit ("BDU") 60. The BDU may also have a beam analysis module ("BAM") 62 at its terminus closest to the delivery of the laser output light beam to the manufacturing apparatus, e.g., one performing TFT annealing. Details of the BDU 60, according to various embodiments of the present invention, depends upon the application. For example, for TFT annealing, the beam could in some cases need homogenization, in a beam homogenizer 70, and then be delivered to illuminate a slit 80, e.g., using a cylindrical focusing lens 90. The magnified image of the slit 80, according to an embodiment of the present invention could then be projected onto the substrate, eg., at a workstation 92. According to an aspect of an embodiment of the present invention, it is very important that the beam illuminates the slit 80 correctly on every pulse. Otherwise intensity variations at the substrate will result with resulting ineffective surface/substrate processing. Thus, the active stabilization technology, e.g., employed in the BDU 60, e.g., utilizing laser control information and information provided from the BAM 62 can be key to delivering the required energy stability.

According to an aspect of an embodiment of the present invention the present invention utilizes in the proposed POPA SSPPM technology, including, e.g., active jitter/ timing control, which, among other things are keys in making the proposed POPA laser into an efficient, scalable and high power XeCl laser in the 1000 W range.

Figure 2A:
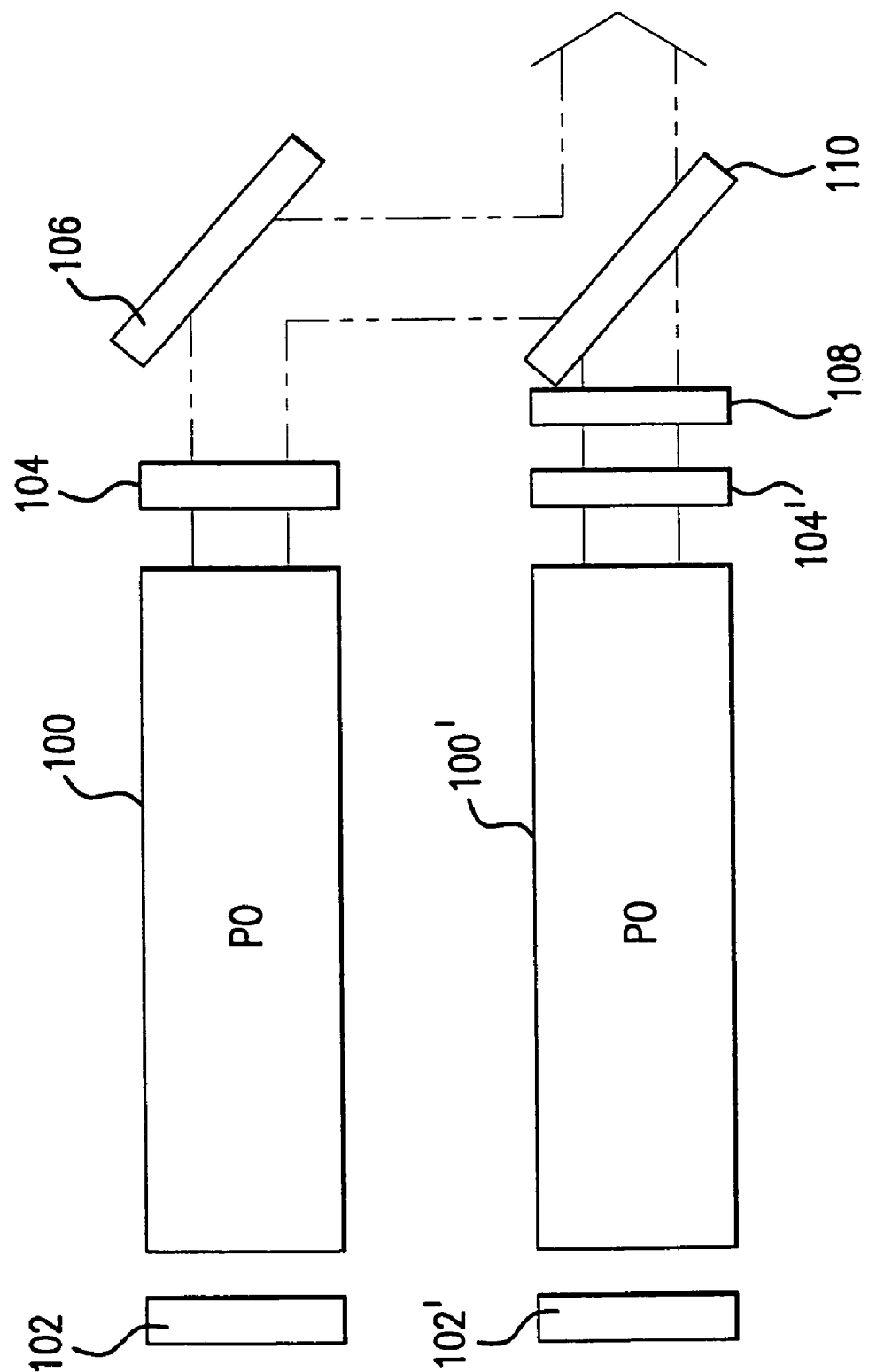
FIG. 2A shows a block diagrammatic schematic view of an embodiment of the present invention.

The laser system according to an embodiment of the present invention could also be configured in a POPO configuration, as shown in FIG. 2A, including a first PO 100 and a second PO 100,' each having a respective totally reflective optic 102, 102', such as a totally reflective mirror and an output coupler 104,104'. The output of the first PO 100 may be reflected by a totally reflective mirror 106 to an mirror set at brewster's angle with respect to the polarization of the output of the first PO 100, so as to totally reflect that beam, and the output of the second O 100' may be passed through a quarter wwave plate 108 to rotate its polarity to be orthogonal to that of the output of the first PO 100, so that the mirror 11o at Brewster's angle wo;; not reflect any of that beam and the two output beams will follow the same output path from the mirror 110, the pulses of which being temporally spaced from each other.

As used on this specification, the acronyms and definitions listed in Table I shall have the meanings also there listed.

TABLE I

| | |
|---|---|
| AC/DC Distribution | This module conditions primary mains power to provide primary power to the SSPPM and other laser modules. This module also provides 24 Vdc auxiliary power to laser modules. The AC/DC Distribution Module is also the central point for safety and emergency shutdown functions, including water leak detection and EMO. |
| Chamber | The Chamber is the pressure vessel in which the fluorine-containing lasing medium is confined. The Compression Head attaches to the Chamber to form an integrated unit. |
| CAN | Control Area Network - a standardized serial bus. |

TABLE I-continued

| | |
|---|---|
| CH | Compression Head - Part of the SSPPM that receives pulsed electrical power from the CMTTR Module. It provides pulsed energy to charge a capacitor bank located on the Chamber. |
| CMTTR | Commutator - Part of the SSPPM that receives pulsed electrical power from the RC Module. It provides pulsed energy to charge a capacitor bank located in the Compression Head Module. |
| EMO | Emergency Off (Switch) |
| FCP | Fire Control Processor - Controls timing, synchronization, and energy of laser. |
| Forward transfer | Energy pulse transferring from the input to the output of the module. |
| FRU | Field Replacement Units |
| HVPS | High Voltage Power Supply - Part of the SSPPM that receives electrical power from the AC Distribution Module. It provides current to charge a storage capacitor bank located in the Resonant Charger Module. |
| IMS | Interlock Management System |
| LCP | Laser Control Processor - Controls gas management, interlocks, user interface, etc. |
| LCS | Laser Control System |
| PCB | Printed Circuit Board |
| PO | Power Oscillator |
| MTBF | Mean Time Between Failure |
| MTTR | Mean Time To Recovery |
| PA | Power Amplifier |
| RC, RCS | Resonant Charger - Part of the SSPPM that receives d.c. electrical power from the HVPS Module. It provides pulsed energy to charge a capacitor bank located in the Commutator Module. |
| Reversal | Reflected energy transferring from the output to the input. Under normal operation reflected energy can be up to 50% of the forward energy pulse. Up to 100% reflected energy can be caused by arcing in the Compression Head or Chamber |
| SSPPM | Solid State Pulse Power Module |
| TEM | Timing and Energy Module |

Figure 3:
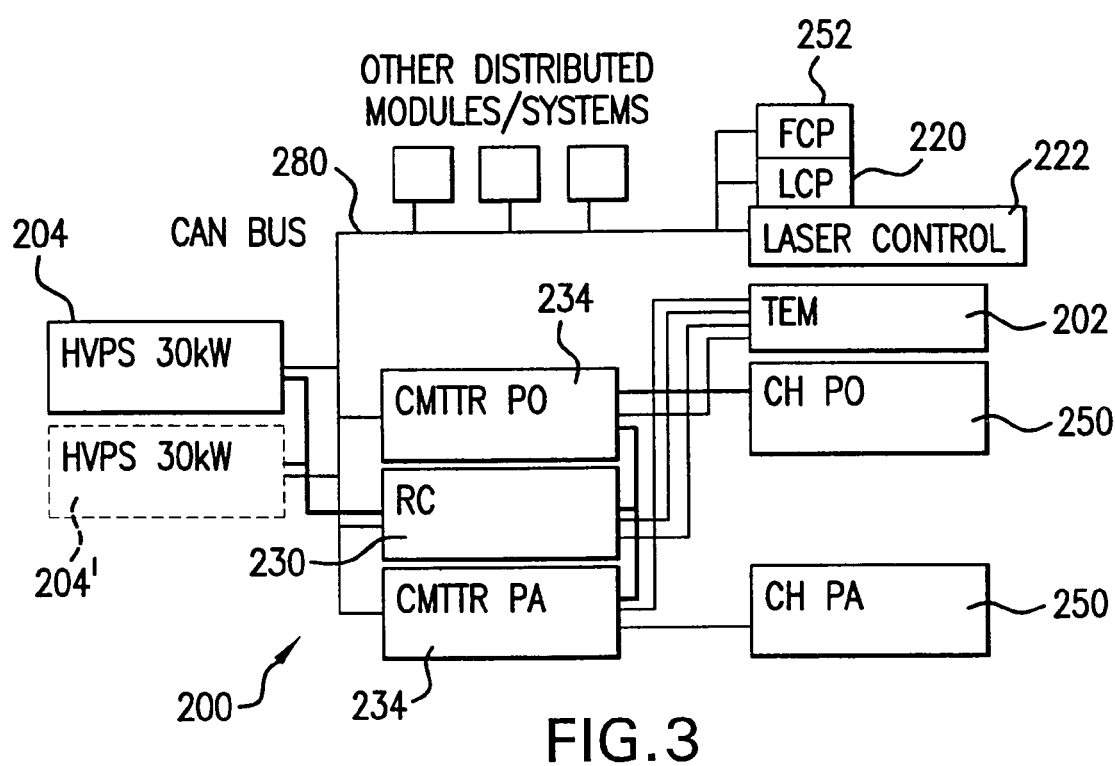
FIG. 3 shows a block diagrammatic schematic view of an embodiment of the present invention.
Figure 4:
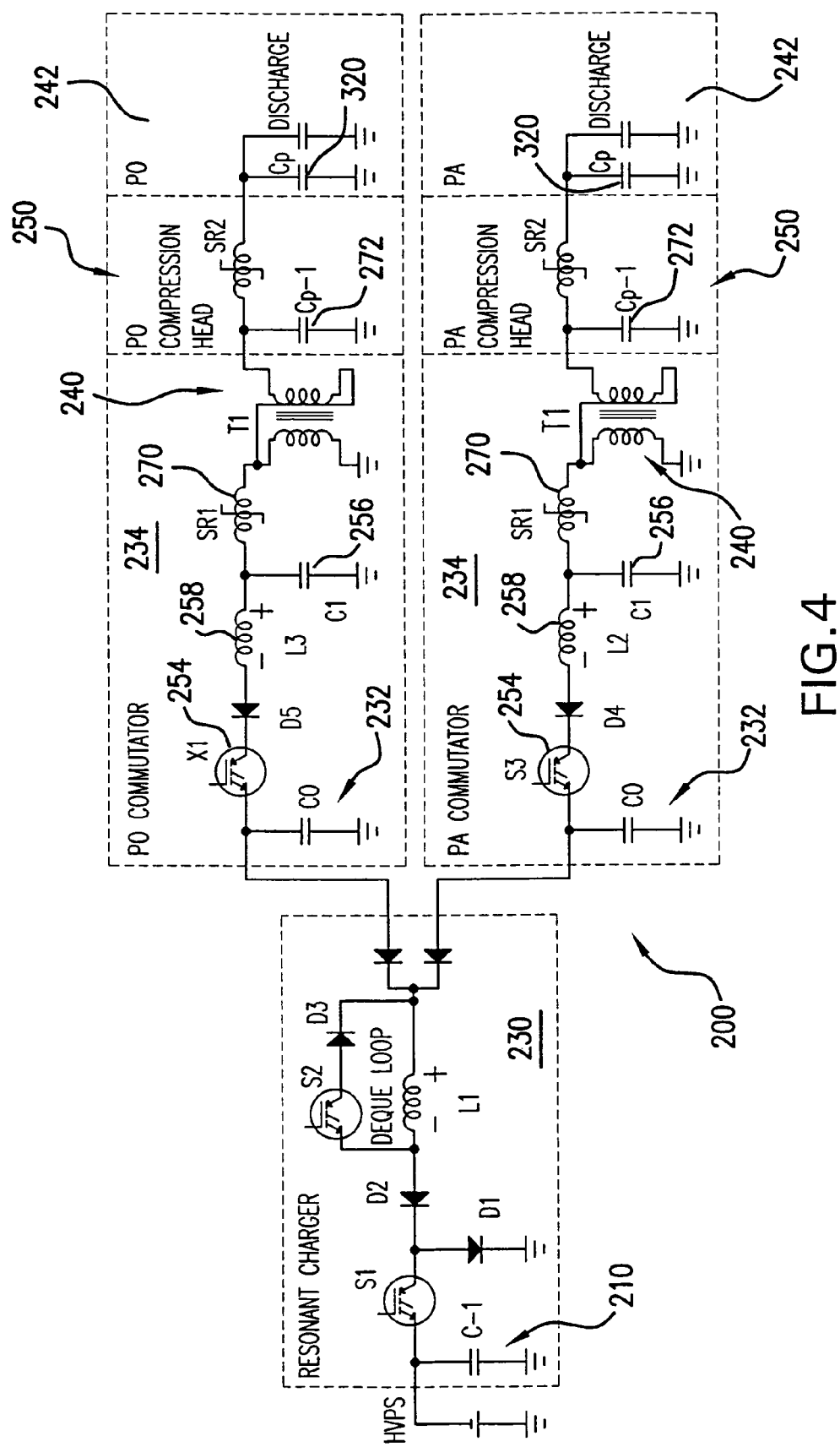
FIG. 4 shows a schematic view of a solid state pulse power system according to an embodiment of the present invention.

Turning now to FIGS. 3 and 4 there is shown a solid state pulse power module ("SSPPM") 200 is provided according to an embodiment of the present invention. The SSPPM 200 may include a TEM 202, the need for which is primarily driven by the dual-channel configuration of the SSPPM 200. This dual channel configuration requires much more precise trigger timing than previous systems, e.g., utilizing only a single laser gas discharge chamber. In addition to providing trigger signals internal to the SSPPM 200, the TEM 202 is the source certain monitoring and control signals, e.g., "Sync Out", which can be used, e.g., for a workstation control unit (not shown) and the TEM 202 can also provide a "Wavelength Correction Trigger" to the Optical Subsystem (not shown) according to an embodiment of the present invention.

Also incorporated in the SSPPM 200 may be an HVPS 204, which can receive AC power from an AC Distribution Module (not shown) and charge and maintain a constant voltage on a storage capacitor bank C-1 210 in a Resonant Charger 212. The HVPS 204 receives an ON command from and sends faults to an LCP 220 in a Laser controller 222.

The SSPPM 200 also can include an RC 230 which can receive a constant voltage from the HVPS 204 (and also 204') and provide pulse charges to a capacitor bank 232 ($C_0$) in a commutator portion 234 of the SSPPM 200, when a trigger is sent from the laser controller 222. The RC 230 receives a trigger signal and a HV set point from the FCP and sends certain signals, e.g., identifying faults to the LCP 220. The commutator 234 can receive a pulsed charge from the resonant charger 230 and transform it by compressing the pulse rise time and stepping up the voltage through a transformer 240. The commutator 234 receives a trigger signal from and sends certain signals, e.g., identifying faults to the LCP 220. The SSPPM 200 can also include a compression head ("CH") 250 that can receive a pulsed charge from the commutator 234 and compress the pulse rise time and deliver it received pulse that has been further compressed to a peaking capacitor bank 260 on the respective chamber 12, 22 for the PO 10 and PA (or PO) 20.

In carrying out its primary high voltage function the commutator module 234 of the SSPPM 200 receives a charge voltage from the RC 230 onto the capacitor bank $C_0$ 210 and a trigger signal from the FCP 252 within the laser controller 222. When a trigger signal is sensed the commutator 234 closes a solid state switch 254 discharging the $C_0$ capacitor bank 210 into a $C_1$ capacitor bank 256 through a charging inductance 258. The voltage is held on $C_1$ 256 until the magnetic switch in the first stage reactor 270 saturates and discharges $C_1$ 256 into a capacitor bank $C_{p-1}$ 272 in the compression head 250 through the first stage reactor 270 and the step up transformer 240. This discharge has the dual function of compressing the pulse in transfer time and increasing the output voltage through the step up ratio of the transformer 240.

A secondary low voltage protection and control function of the commutator module 234 of the SSPPM 200 is carried out by the commutator 234 sensing a limited number of faults within the module and transmitting signals representative of such faults to the LCP 220 for handling via a CAN bus 280 interface. The SSPPM 200 can protect itself by disabling the triggering of the solid state switches 254 and 254' when a fault is detected. A voltage can, however, be applied to the $C_0$ capacitor bank 210 if the LCP 220 does not receive or fails to interpret a fault signal transmitted by the commutator module 234.

Figure 5:
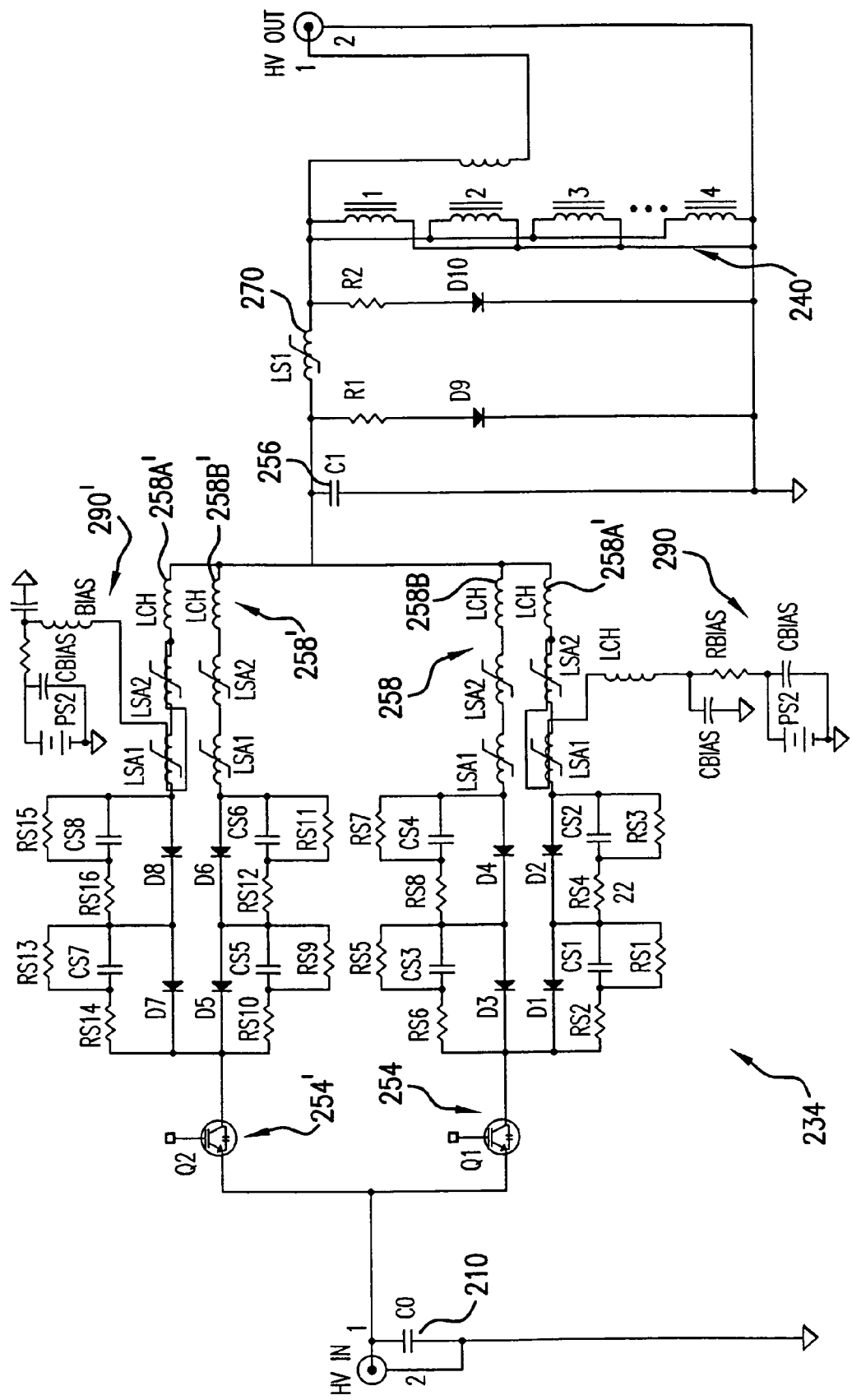
FIG. 5 shows a more detailed schematic view of a commutator module shown in FIG. 4 according to an embodiment of the present invention.
Figure 6:
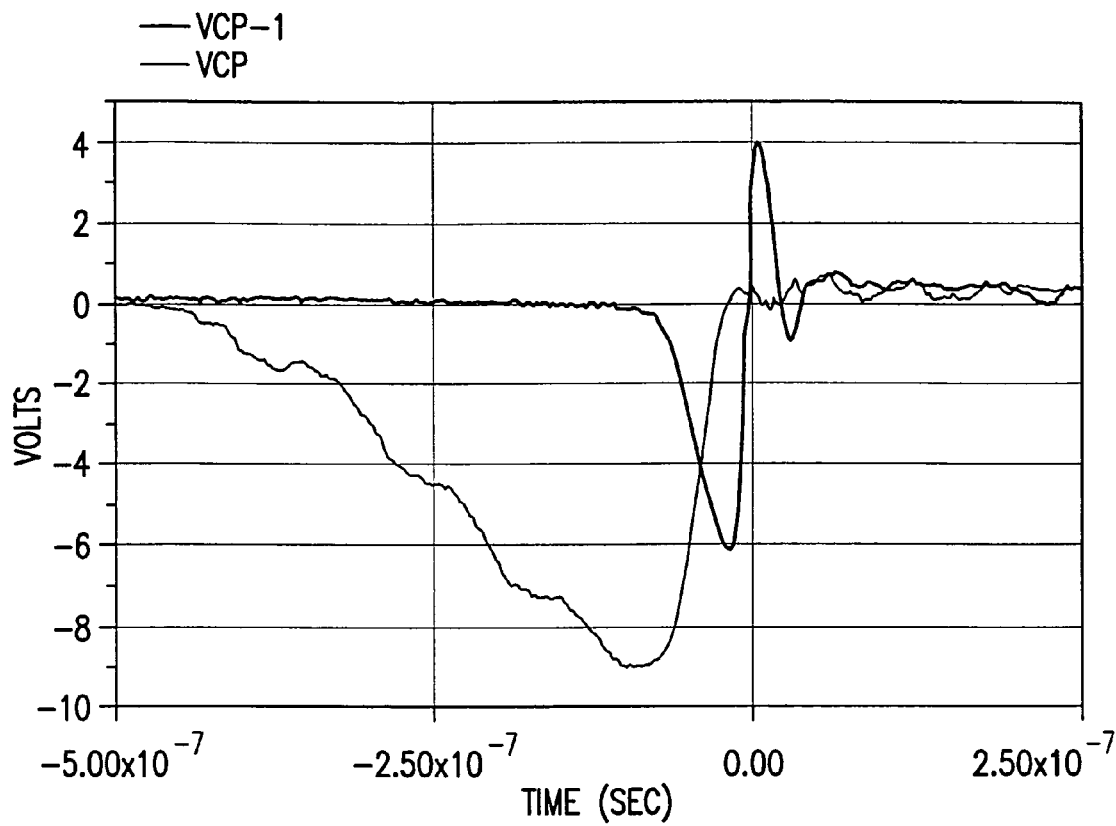
FIG. 6 shows a timing diagram of the charging a peaking capacitor in a chamber module shown in FIG. 4 from a compression head module shown in FIG. 4, according to an embodiment of the present invention.

FIG. 5 shows a more detailed schematic diagram of the commutator module 234, and FIG. 6 shows a simplified schematic. It can be seen in FIG. 5 that the solid state switch 254 and charging inductance 258 is actually two parallel circuits containing solid state switches 254, 254' and charging inductance 258, 258' in order to provide for operations at up to and above 4000 Hz gas discharges in the respective chambers due to the time required for each switch 254, 254' to recover after firing and be ready to fire again. Also shown in FIG. 5 is circuitry, including a diode arrangement respectively including, for solid state switch 254, diodes $D_1$–$D_4$, with respective parallel RC networks, including, respectively for each of the diodes $D_1$–$D_4$, $R_{s1}$, $R_{s3}$, $R_{s5}$, and $R_{s7}$, $R_{s2}$, $R_{s4}$, $R_{s6}$, and $R_{s8}$, and $C_{s1}$–$C_{s4}$, and for solid state switch 254', diodes $D_5$–$D_8$, with respective parallel RC networks, including, respectively for each of the diodes $D_5$–$D_8$, $R_{s9}$, $R_{s11}$, $R_{s13}$, and $R_{s15}$, $R_{s10}$, $R_{s12}$, $R_{s14}$ and $R_{s16}$, and $C_{s5}$–$C_{s8}$, which serve to protect the respective solid state switches 254 and 254'. The respective solid state switches 254 and 254' are protected by the series diodes and their snubber networks. The diodes prevent reflected energy from the discharge electrodes from flowing through the solid state switches 254 and 254'. The switches 254 and 254' are protected because when reflected energy reaches these series diodes, the diodes turn off and prevent current flow through the diodes and solid state switches. The resistors and capacitors in the snubber networks help to limit how quickly the diodes turn off, thus improving the protection and reliability the circuit. In addition, biasing networks 290, 290' for the respective solid state switches 254, 254' include biased saturable inductors LSA1, LSA2, in series with diodes $D_1$ and $D_2$ and biased in opposite directions from a bias power source PS2, through a biasing capacitor $C_{bias}$ in parallel with the power source PS2, and an RLC network consisting of an $R_{bias}$ and an $L_{bias}$ in series with the capacitor $C_{bias}$ and one of two charging inductors 258A, 258B, with an additional $C_{bias}$ connected between the node between the $R_{bias}$ and $L_{bias}$ and ground, and non-saturating inductors LSA1 and LSA2 in series with diodes $D_3$ and $D_4$ and charging inductor 258B, and respecting solid state switch 254', biased saturable inductors LSA1', LSA2', in series with diodes $D_7$ and $D_8$ and biased in opposite directions from a bias power source PS2,' through a biasing capacitor $C_{bias}$' in parallel with the power source PS2', and an RLC network consisting of an $R_{bias}$' and an $L_{bias}$' in series with the capacitor $C_{bias}$' and one of two charging inductors 258A', 258B', with an additional $C_{bias}$' connected between the node between the $R_{bias}$' and $L_{bias}$' and ground, and non-saturating inductors LSA1' and LSA2' in series with diodes $D_5$ and $D_6$ and charging inductor 258B. Alternatively all parts of LSA1 and LSA2 can be saturable, i.e., the four sets of conductors and four sets of cores can mechanically be achieved by a single set of cores with all four conductors passing through them. The bias circuit would then resets all four lines and not just two. It will be understood by those skilled in the art that the biasing arrangement(s) serve to properly bias the magnetic material, which allows for predictably maximizing the available flux swing of the material. Predictable reset of magnetic material is important to precise timing control during laser operation. Additionally, the routing of the bias network through the circuit is important to ensuring that the solid state switches and series diodes have sufficient time to turn off and on, respectively. This improves performance and reliability.

In addition, the commutator 234 pulse compression network 300, consists of capacitor $C_1$ 256, in parallel with diodes $D_9$ and $D_{10}$, which are connected through respective resistors $R_1$ and $R_2$ to the two ends of saturable reactor LS1 270, the output of which is connected in series to the primary windings, single turn, on each of a plurality of transformer cores 1-N in the transformer 240, having a single secondary winding passing through each of the cores 1-N. The windings 1-N of the transformer 240 are connected through an inductor 302 across the high voltage and ground portions of a module interconnect output 304.

The requirements for the laser system according to an embodiment of the present invention in terms of pulsed power provide for, e.g., 3.5 J of electrical energy per gas discharge electrical pulse to the electrodes in the respective chamber, at a rate of 4 KHz, to be delivered to $C_0$ for each chamber, i.e., 7.0 J per pulse for the entire pulsed power system according to an embodiment of the present invention. The pulsed power subsystem 200 is required to deliver high voltage pulses to each of the two respective chambers. The discharge time of each chamber must synchronized pulse to pulse to an accuracy of less than +/−2 ns, in order, e.g., to time the delivery of the gas discharge pulse to the PA (PO) when the seed beam from the preceding PO chamber is transiting the PA (PO) chamber. This requires, among other things, that the pulsed power timing to be compensated over the long term to account for such things as thermal drift and short term jitter.

A single HVPS 204, or for higher power two HVPSs 204, 204' can supply the resonant charger 212 to drive two parallel commutator 234/compression head 250/Chamber 242 circuits. The resonant charger 212 can charge each of the two C0 capacitor banks as shown in FIG. 4.

The first stage reactor 270 contributes the most to timing variations. As the reactor 270 heats up the saturation flux density decreases, e.g., causing the reactor 270 to switch earlier. This can cause a switching time that varies with temperature. The switch time can also vary with voltage.

The reactor 270 core (not shown) has a fixed amount of material, and, therefore, the volt-second product is fixed. Effects of temperature can be mitigate or even eliminated, even at very high repetition rates, which ordinarily induce high temperature flux to inductive elements such as used in the laser system according to an embodiment of the present invention through the use of the cooling mechanism disclosed in U.S. patent application Ser. No. 10,607,407, entitled Method and Apparatus for Cooling Magnetic Circuit Elements, filed on Jun. 25, 2003, and assigned to the common assignee of Applicants.

In the compression head 250 the $C_{p-1}$ to $C_p$ transfer can be analyzed as follows:

$V_{Cp}$ is calculated from $$E_{cp} = \tfrac{1}{2}CV^2 \text{ and assuming } E_{cp} = \eta E_{c0}, \text{ where}$$
$$\eta = \_\_\_\_\_.$$

The transfer time from $C_{p-1}$ to $C_p$ is:

$\tau_3 = \pi (L_{s2} C_a)^{1/2}$, where $C_a = C_{p-1} C_p / (C_{p-1} + C_p)$ and $L_{s2}$ is the inductance between $C_{p-1}$ to $C_p$, mostly accounted for by the inductance of saturable reactor SR2 310.

The inductance of the transfer from $C_{p-1}$ to $C_p$ is calculated from:

$$L_{s2} = (\tau_3/\pi)^2 / C_a$$

The peak current is calculated by:

$$I_{pk} = V_{cp-1}(C_a/L_{s2})^{1/2}$$

In the commutator module 234, the $C_1$ to $C_{p-1}$ transfer can be analyzed as follows:

The transformer ratio is limiting by the IGBT 254, 254' withstand voltage, i.e., if the commutator is required to produce 20-kV and the IGBTs have a maximum operating voltage of 2-kV, the minimum transformer ratio would have to be N=10. If N is less than 10 for this case, it would require the IGBT to operate at a higher voltage to achieve the required 20-kV output. The output of the transformer 240 results in $N > V_{Cp-1}/V_{C1}$. The circuit 200 may need to accommodate up to 50K volts, so, assuming an IGBT that can withstand 2K, the transformer ration would need to be 25.

The effective capacitance, $C_2$ of $C_{p-1}$ as seen through the transformer 240 can be calculated from:

$$C_2 = C_{p-1} N^2$$

Using $C_{n-1} \leq C_n$ for magnetic compression to occur according to an embodiment of the present invention $C_1 = 0.94 C_2$ The transfer from $C_1$ to $C_{p-1}$ is, therefore:

$\tau_2 = \pi (L_{s1} C_b)^{1/2}$, where $C_b = C_1 C_2 / (C_1 + C_2)$ and $L_{s1}$ is the inductance between $C_{p-1}$ to $C_p$, mostly accounted for by the inductance of SRI 270. The inductance of the transfer from $C_1$ to $C_{p-1}$ is calculated from:

$$L_{s1} = (\tau_2/\pi)^2 / C_b$$

The peak current is calculated by:

$$I_{pk} = V_{C1}(C_b/L_{s1})^{1/2}$$

The first stage reactor 270 is required to hold off the voltage on $C_1$ until $C_1$ is fully charged. This is accomplished with the first stage reactor 270 being a saturable reactor 270. The reactor core material can be, e.g., a 0.5 mil. 50%—50% Ni—Fe (Orthonol) tape with, e.g., a ΔB of 3.0 T. ΔB=Vτ/(2NA$_m$), where V=Voltage applied, τ=hold off time before saturation, N=number of turns, A$_m$=cross sectional area of core. Based on the ΔB equation, solving for A$_m$=Vτ/2ΔBN The cross sectional area of the core is:

A$_m$=h(R$_o$−R$_i$)(pf), where h=height of the core, R$_o$=outer radius, R$_i$=inner radius, pf=packing factor=0.7

The build of the core is calculated from:

$$w = R_o - R_i = A_m/h/pf$$

The total inductance required for the transfer from $C_1$ to $C_{p-1}$ was calculated earlier to be $L_{S1}$. Stray inductance can play a role in the total inductance unless minimized by design.

$$L_{stray} = L_{xfmr} + L_{C1} + L^{pcb} + L_{cable} + L_{lead}$$

Lstray is a component of the required lump inductance Ls1. This is inductance that is derived from the mechanical layout and is inherent to the design and therefore difficult to predict and control, but may be measured and estimated. Ls1 is the total inductance required for the C1 to Cp-1 transfer. Lxfinr is a component of the stray inductance, Lstray, inherent in the transformer primary and secondary windings. Lc1 is a component of the stray inductance, Lstray inherent to the C1 capacitor geometry. Lpcb is a component of the stray inductance, Lstray, inherent to the layout of the C1 printed circuit board. Lcable is a component of the stray inductance, Lstray, inherent to the high voltage cable (not shown) connecting the commutator and compression head. Llead a component of the stray inductance, Lstray, inherent to the layout of the high voltage cable connection inside the compression head. $L_{sat} = L_{s1-Lstray}$. The saturated inductance for the core is calculated from:

$L_{sat} = \mu_0 N^2 A_c/<l>$, where $\mu_0 = 4\pi 10^{-7}$, N=number of turns, $A_c$=cross sectional area of core based on $L_s$ equation, <l>=mean path length. Solving for $A_c/<l> = L_{sat}/\mu_0 N^2$ $$<l> = 2\pi <R> = 2\pi(R_i + (R_o - R_i)/2) = \pi(R_o + R_i)$$

Setting $A_c = A_m$, <l> can be calculated.

$$(R_o + R_i) = <l>/\pi$$

Core losses are calculated from:
Loss/Pulse=Vol $(H_{c\Delta B + (wt\Delta B)}^2/4\rho\tau)$, where Vol=$H\pi((R_o)^2 - (R_i)^2)$, $H_c$=19.9 A/m, $w_t$=tape thickness, $\rho$=material resistivity, $\tau$=charge time.

The capacitor $C_1$ design requires that the dc voltage withstand capability for the charge voltage and the dV/dt rating of the capacitor $C_1$ be met. Ideally the design would be a single capacitor with low packaging inductance. This ideal capacitor currently does not exist. To achieve the desired capacitance, a parallel array of small value caps can be used. To achieve the desired voltage withstand, the capacitors may be connected in series. This results in a series parallel array. The dV/dt of the capacitor $C_1$ can be calculated by two methods. The first is to divide the $V_{C1}$ voltage by the transfer time from $C_1$ to $C_{p-1}$. The second method is to use the peak current, knowing that $I = C_b(dV/dt)$. The capacitor $C_0$ design is similar to the $C_1$ design just discussed.

Using $C_{n-1} \leq C_n$ for magnetic compression and then applying the ratio $C_0 = 0.933 C_1$, the transfer from $C_0$ to $C_1$ can be analyzed as follows:

$\tau_1 = \pi(L_{CH} C_c)^{1/2}$, where $C_c = C_0 C_1/(C_0 + C_1)$ and $L_{CH}$ is the inductance between $C_0$ to $C_1$. The inductance of the transfer from $C_0$ to $C_1$ is calculated from:

$$L_{CH} = (\tau_1/\pi)^2/C_C$$

The peak current is calculated by:

$$I_{pk} = V_{C0}(C_c/L_{s0})^{1/2}$$

Table II gives the SSPPM 200 module design parameters:

TABLE II

| Parameter | Value |
| --- | --- |
| Pulse Repetition Rate | 0–4 kHz |
| E/pulse | 3.5 J |
| $\tau_0$ | 100 μs |
| $VC_0$ | −750 to −1150 V +/− 0.1% |
| $C_0$ | 5.3 μF |
| $C_1$ | 5.7 μF |
| $\tau_1$ | 3.8 μs |
| $\tau_2$ | 420 ns |
| $L_{CH}$ | 533 nH |
| $L_{s1}$ | 5.5 nH |
| N | 25 |
| $VC_{p-1}$ | −18.75 to −30 kV |
| $C_{p-1}$ | 9.68 nF |
| $C_p$ | 11.88 nF |

Table III gives performance specifications:

TABLE III

| Parameter | Product Specification | Test Definition/Comments |
| --- | --- | --- |
| Inputs | | |
| HV Input Voltage Range (VC0) | See Table II (Commutator Design Parameters) | Accuracy and repeatability measured for all repetition rates, voltages and burst modes. |
| HV Input Current | ≦65 A rms | |
| HV Input Capacitance(C0) | See Table II (Commutator Design Parameters) | |
| HV Input Charging Time ($\tau_0$) | See Table II (Commutator Design Parameters) | Defined as the time interval between when charging is initiated and when the HV Input Capacitance is charged to the maximum input voltage. The resonant frequency is defined by the resonant charger series inductance and the commutator HV Input Capacitance. The resonant charge time depends on the resonant frequency and the previous pulse reflected energy released as initial condition current. |
| Auxiliary Input Voltage | 24 Vdc ± 10% | |
| Auxiliary Input Current | ≦10 A rms | |

TABLE III-continued

| Parameter | Product Specification | Test Definition/Comments |
|---|---|---|
| Load Capacitance ($Cp_{-1}$) | See table II (Commutator Design Parameters) | |
| Warm-up Time | ≦5 seconds | Defined as the time from the application of auxiliary power to the time the Commutator is ready for full voltage, full power operation. |
| *Internal* | | |
| C0 to C1 transfer time ($\tau_2$) | See table II (Commutator Design Parameters) | Defined as a curve fit of the current waveform of the transfer from $C_0$ to C1. The function is of the form: $i(t) = A*SIN(\pi/\tau_1 t)$ |
| *Outputs* | | |
| Output Voltage ($VCp_{-1}$) | See table II (Commutator Design Parameters) | Defined as the transformer ratio times the input voltage, $VC_{p-1} = N*VC_0$ |
| Efficiency | 80% | Minimum at maximum power out, assuming no reflected energy |
| Pulse Repetition Rate | See table II (Commutator Design Parameters) | |
| Output Power | ≦14 kW | |
| Output Pulse Transfer Time ($\tau_2$) | See table II (Commutator Design Parameters) | Defined as a curve fit of the current waveform of the transfer from $C_1$ to $C_{p-1}$. The function is of the form: $i(t) = A*SIN(\pi/\tau_2 t)$ |
| Output Pulse Transfer Time Jitter | <5 ns | Pulse to pulse at all specified repetition rates |
| Trigger in to output pulse delay | See Table IV (Delay Characteristics Cold) and table V (Delay Characteristics Hot) | Measured from trigger in to Commutator to falling edge of $VCp_{-1}$. Limits set by statistical analysis of historical data. |
| Volt-Seconds of 1$^{st}$ stage reactor | 2.4 mV-s +/− 5% | Measurement the volt-second integral of the $VC_1$ signal at 25° C. |

Table IV gives delay characteristic in a cold state, which is measured from trigger in to Commutator to falling edge of VCp-1, with limits to the delay characteristic set by statistical analysis of historical data, and with the module being operated with components are room temperature (25 deg C. nominal) and assumed to be a thermal equilibrium.

TABLE IV

| Voltage | Standard Cold | Upper Limit Cold | Lower Limit Cold |
|---|---|---|---|
| 800 | 5.9087E−06 | 6.2042E−06 | 5.6133E−06 |
| 850 | 5.6992E−06 | 5.9841E−06 | 5.4142E−06 |
| 900 | 5.5076E−06 | 5.7830E−06 | 5.2323E−06 |
| 950 | 5.3382E−06 | 5.6051E−06 | 5.0713E−06 |
| 1000 | 5.1873E−06 | 5.4467E−06 | 4.9280E−06 |
| 1050 | 5.0530E−06 | 5.3056E−06 | 4.8003E−06 |
| 1100 | 4.9307E−06 | 5.1772E−06 | 4.6841E−06 |
| 1150 | 4.8184E−06 | 5.0593E−06 | 4.5775E−06 |
| 1200 | 4.7174E−06 | 4.9533E−06 | 4.4816E−06 |

Table V gives delay characteristics in a hot state, defined by a module that is being operated at full voltage and rep-rate for a time sufficient to allow the components to reach thermal equilibrium.

TABLE V

| Voltage | Standard Hot | Upper Limit Hot | Lower Limit Hot |
|---|---|---|---|
| 800 | 5.7266E−06 | 6.0130E−06 | 5.4403E−06 |
| 850 | 5.5322E−06 | 5.8088E−06 | 5.2555E−06 |
| 900 | 5.3589E−06 | 5.6268E−06 | 5.0909E−06 |
| 950 | 5.2022E−06 | 5.4623E−06 | 4.9421E−06 |
| 1000 | 5.0636E−06 | 5.3167E−06 | 4.8104E−06 |
| 1050 | 4.9367E−06 | 5.1835E−06 | 4.6899E−06 |
| 1100 | 4.8232E−06 | 5.0644E−06 | 4.5821E−06 |

TABLE V-continued

| Voltage | Standard Hot | Upper Limit Hot | Lower Limit Hot |
|---|---|---|---|
| 1150 | 4.7195E−06 | 4.9555E−06 | 4.4836E−06 |
| 1200 | 4.6257E−06 | 4.8570E−06 | 4.3945E−06 |

It will further be understood that $C_0$ capacitor bank 232 receives a pulsed charge from the resonant charger 230. Voltage is held on this capacitor bank $C_0$ 232 until one of the solid state switches 254, 254' is closed in response to a trigger signal from the FCP 252 in the LC 222. Critical parameters are the dc voltage withstand, dV/dt, and peak current capability. The solid state switch 254, 254' hold the voltage on $C_0$ until the trigger command from FCP 252, and when the trigger signal is received, the respective switch 254, 254' closes and connects $C_0$ 232 to $C_1$ 256, through the respective charging inductors $L_{CH}$ A and $L_{CH}$ B, and $L_{CH}$ A' and $L_{CH}$ B'. Critical parameters are the dc voltage withstand, dV/dt, turn on rise time, turn on delay, turn on jitter, and peak current. The respective blocking diodes $D_1$–$D_4$ and $D_5$–$D_8$ stops any voltage from ringing back onto $C_1$, e.g., during reversal after the electrodes are fired. When $C_1$ has a positive voltage the blocking diodes $D_1$–$D_4$ and $D_5$–$D_8$ will conduct and the voltage will transfer to $C_0$ through the respective charging inductor(s) $L_{CH}$ A and $L_{CH}$ B, and $L_{CH}$ A' and $L_{CH}$ B'. When the voltage starts to reverse and ring back the diodes $D_1$–$D_4$ and $D_5$–$D_8$ turn off, holding the voltage on $C_0$, and reducing the amount that the RC has to charge the respective $C_0$ for the next firing, also conserving time and improving efficiency. A voltage sensing circuit (not shown) provides a signal to the LCP 220 in the LC 222, which indicated the amount of charge on $C_0$, and the LCP can calculate the needed charge for the next firing and provide a signal to the RC 230 accordingly. Critical parameters are the dc voltage withstand, dV/dt, reverse recovery time, and peak current. The biasing networks provide for saturable assist. There are (2) sets of saturable assist. The first, comprising LSA2 holds off current flow until the respective solid state switch 254,254', which may be an IGBT, e.g., a CM800HA-34H, made by Powerex is fully closed. The second, comprising LSA1 is there to hold off current until the respective diodes $D_1$–$D_4$ and $D_5$–$D_8$ are fully recovered during reversal. Critical parameters are the saturation time and drift with temperature.

The respective charging inductors $L_{CH}$ A and $L_{CH}$ B 258 A,B, and $L_{CH}$ A' and $L_{CH}$ B' 258A', B' set the transfer time and limit the peak current in the solid state switches 254, 254' and diodes $D_1$–$D_4$ and $D_5$–$D_8$. This inductance $L_{CH}$ A and $L_{CH}$ B, and $L_{CH}$ A' and $L_{CH}$ B' includes all stray inductance and winding inductance. In the $C_1$ capacitor bank 256 voltage is held on this capacitor bank $C_1$ 256 until the respective solid state switch 254, 254' is closed. Critical parameters are the dc voltage withstand, dV/dt, and peak current capability. For the first stage saturable reactor 270, critical parameters are volt-second holdoff, Volts per turn, delta B. For the pulse transformer 240, critical parameters are the volt-seconds, Volts per turn, delta B. For the diode snubber circuit, comprising RS2, CS1, and RS1 or the equivalent attached across D2, 3, 4, 5, 6,7, or 8, critical parameters are the power, voltage and current rating. For the $C_1$ and $C_2$ blip snubber circuits, comprising R1, D9 for C1 and R2, D10 for C2, critical parameters are the power, voltage and current rating.

Some of the signals employed by the SSPPM 200 include:

1. $VC_0$ Voltage Monitor Signal (J1), which comprises a buffered analog signal representing the $VC_0$ voltage waveform. This signal can be derived from a resistive voltage divider (not shown) connected directly to $C_0$ (400 kΩ±1% top leg×4.01 kΩ±1% bottom leg). The scale factor can be a function of the terminating impedance in the laser controller 222 and/or attached oscilloscopes (not shown). If the equivalent terminating impedance is greater than 400 kΩ then the scale factor will be 1 V per 100 V.

2. $VC_1$ Voltage Monitor Signal (J2), which can be a buffered analog signal representing the $VC_1$ voltage waveform for monitoring by the laser controller 222. This signal can be derived from a resistive voltage divider (not shown) directly connected to $C_1$ (5 kΩ±1% top leg×49.9 Ω±1% bottom leg). The scale factor can be a function of the terminating impedance in the laser controller 222 and/or attached oscilloscopes (not shown). If the equivalent termination impedance is equal to 50 Ω then the scale factor will be 1 V per 201 V.

3. BDOT Signal (J3), which can be a buffered analog signal representing the time derivative of the current flowing between $C_1$ and $C_2$ (dI/dt), which can be used by the laser controller 222, e.g., to generate a Sync Out signal. This Sync Out signal can be derived from a magnetic field pickup loop (not shown) located next to the primary side of the pulse transformer 240. The amplitude of this signal can be a function of the terminating impedance in the controller 222 and/or attached oscilloscopes (not shown). If the equivalent terminating impedance is equal to 50 Ω then the full-scale amplitude will be ~1.5–5 V depending on charge voltage. This signal may be used solely for reference.

4. $VC_2$ Voltage Monitor Signal (J4), which can be a buffered analog signal representing the $VC_2$ voltage waveform for monitoring by the laser controller. This signal is derived from a resistive voltage divider (not shown) connected on the primary side of the pulse transformer 240, which can couple to $C_2$ (5 kΩ±1% top leg×49.9Ω±1% bottom leg). The scale factor can be a function of the terminating impedance in the control module and/or attached oscilloscopes. If the equivalent terminating impedance is equal to 50Ω then the scale factor will be 1 V per 201 V.

5. Commutator Trigger (J5), which can be a buffered signal representing the commutator trigger.

The CAN bus 280 interface can connect the commutator control portion of the laser controller 222 to the commutator and to the RC's internal controller, e.g., by a 68 pin interconnection, with the indicated conditions when each of the pins is at high, i.e., is set, shown in Table VII:

TABLE VII

| Pin | Signal | Assignment | Remarks |
| --- | --- | --- | --- |
| 1 | Error 1 | VC0 Low | This is a fault logic signal, open collector active low. If the commutator receives a trigger, and the voltage on VC0 is lower than the set threshold (700 V), the commutator trigger will be disabled, and this fault signal will be asserted. |
| 2 | Error 2 | VC0 Reversal Over Voltage | This is a fault signal, open collector active low. If the reflected energy voltage reversal pulse is greater than the set threshold (800 V), the commutator trigger will be disabled, and this fault signal will be asserted. |
| 3 | Error 3 | VC0 Over Voltage | This is a fault signal, open collector active low. If the commutator receives a trigger, and the voltage on VC0 is higher than the set threshold (1500 V), the commutator trigger will be disabled, and this fault signal will be asserted. |
| 4 | Error 4 | Not used | |
| 5 | Error 5 | 24 V Low | This is a fault logic signal, open collector active low. If the 24 V power coming into the control board falls below 19 V, the commutator trigger will be disabled, and this fault signal will be asserted. |
| 6 | Error 6 | Chassis Over Temperature | This is a fault signal, open collector active low. If the commutator temperature is above the set threshold (65° C.), the thermostat will trip, the commutator trigger will be disabled, and this fault signal will be asserted. The fault will be asserted until the thermostat is reset manually. |
| 7 | Error 7 | Reactor Over Temperature | This is a fault signal, open collector active low. If the commutator receives a trigger and the temperature of the reactor switch housing is above the set threshold (85° C.), the |

TABLE VII-continued

| Pin | Signal | Assignment | Remarks |
|---|---|---|---|
| | | | commutator trigger will be disabled, and this fault signal will be asserted. |
| 8 | Error 8 | Not used | |
| 9 | Error 9 | Not used | |
| 10 | Error 10 | Not used | |
| 11 | Error 11 | Not used | |
| 12 | Error 12 | Not used | |
| 13 | Error 13 | Not used | |
| 14 | Error 14 | Not used | |
| 15 | Error 15 | Not used | |
| 16 | Error 16 | Not used | |
| 17 | GND | | I/O ground |
| 18 | Status 1 | Power ON indicator | Active low |
| 19 | Status 2 | Sum Fault | Active low |
| 20 | Status 3 | Not used | |
| 21 | Status 4 | Not used | |
| 22 | Status 5 | Not used | |
| 23 | Status 6 | Not used | |
| 24 | Status 7 | Not used | |
| 25 | Status 8 | Not used | |
| 26 | GND | | I/O ground |
| 27 | Control 1 | Laser ON | Clears internally latched faults when this signal goes high. |
| 28 | Control 2 | | |
| 29 | Control 3 | | |
| 30 | Control 4 | | |
| 31 | Control 5 | | |
| 32 | Control 6 | | |
| 33 | Control 7 | Self Test Enable | Implements wrap-around test mode |
| 34 | Control 8 | Self Test Data | Write signal to artificially assert bits |
| 35 | GND | | I/O ground |
| 36 | Addr 1 | Hardwire Frame Location ID | 0 Hardwired in Commutator control board |
| 37 | Addr 2 | Hardwire Frame Location ID | 0 Hardwired in Commutator control board |
| 38 | Addr 3 | Hardwire Frame Location ID | 0 Hardwired in Commutator control board |
| 39 | Addr 4 | Hardwire Frame Location ID | 0 for MO Commutator  1 for PA Commutator |
| 40 | GND | | I/O ground |
| 41 | Config 1 | DS Ident Chip lines | Dallas Semiconductor chip DS2430A |
| 42 | Config 2 | Not used | |
| 43 | Config 3 | Not used | |
| 44 | Config 4 | Not used | |
| 45 | GND | | I/O ground |
| 46 | CAN +5 V | | Used to power CAN side of Opto-isolators |
| 47 | GND | | I/O ground |
| 48 | | | |
| 49 | | | |
| 50 | | | |
| 51 | | | |
| 52 | | | |
| 53 | | | |
| 54 | | | |
| 55 | | | |
| 56 | | | |
| 57 | +24 V | +24 V from host module to CAN | |
| 58 | +24 V | +24 V from host module to CAN | |
| 59 | Ground | 24 V return | |
| 60 | Ground | 24 V return | |
| 61 | | | |
| 62 | | | |
| 63 | | | |
| 64 | | | |
| 65 | | | |
| 66 | | | |
| 67 | | | |
| 68 | | | |

Figure 7:
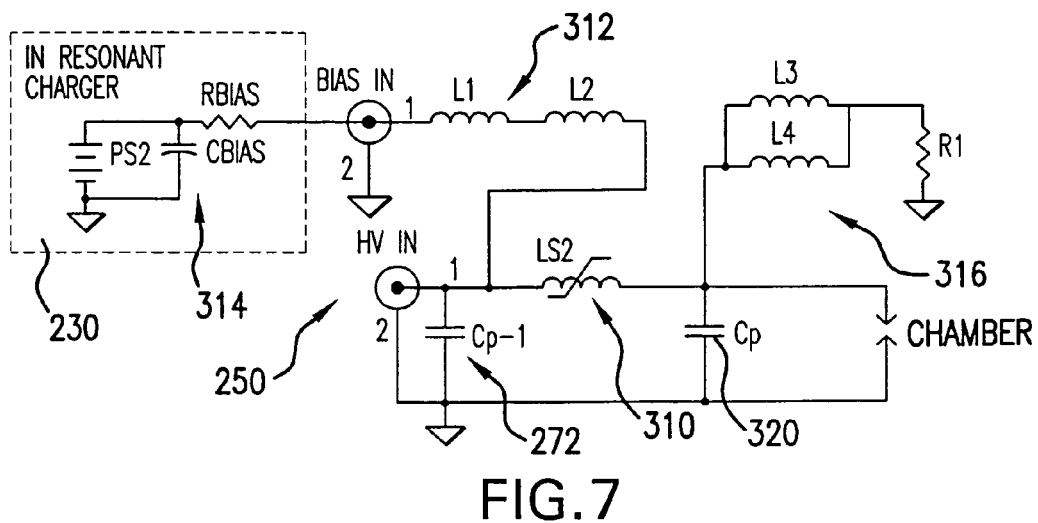
FIG. 7 shows a more detailed view of the compression head and chamber modules shown in FIG. 4.
Figure 8:
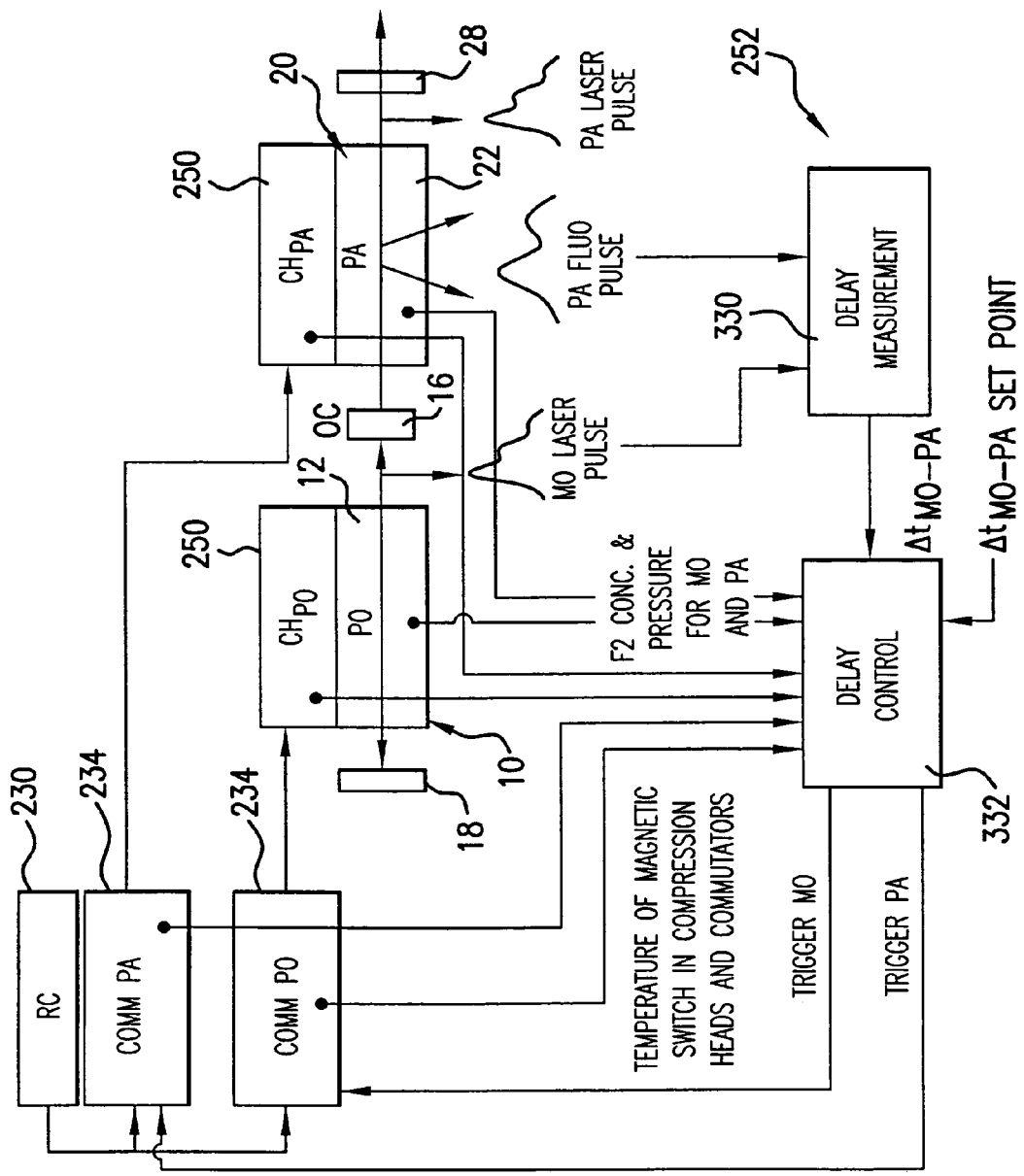
FIG. 8 shows a block diagram schematic view of a timing and control module according to an embodiment of the present invention; and, FIG. 9 shows a timing diagram used in an embodiment of the present invention.

With regard to the SSPPM 200 compression head 250, operation at at least 4 kHz, and 28.750 kV is contemplated according to an embodiment of the present invention. The compression head 250 can receive a pulsed charge from the commutator 234 and compress the pulse rise time and deliver it to a peaking capacitor bank 320 at the respective chamber 10, 20. The compression head 250 can receive a pulsed charge on the $C_{p-1}$ capacitor bank 272 from the $C_1$ capacitor bank 256. The voltage is held on $C_{p-1}$ until the magnetic switch in the output reactor SR2 310 saturates and discharges $C_{p-1}$ into $C_p$. This discharge compresses the pulse rise time as shown in FIG. 7. FIG. 7 shows that $C_{p-1}$ charges in roughly $4.0 \times 10^{-7}$ seconds and discharges onto $C_p$ in roughly $1 \times 10^{-7}$ seconds. FIG. 8 shows a schematic diagram of the compression head 250 module.

The compression head 250 reactor SR2 310 can be required to hold off the voltage on $C_{p-1}$ until $C_{p-1}$ is fully charged. This is accomplished with a saturable reactor 310 having a core material which can be a 0.5 mil. 80%–20% Ni—Fe (Supermalloy) tape with a ΔB of 1.5 T.

$\Delta B = V\tau/(2NA_m)$, where V=Voltage applied, τ=hold off time before saturation, N=number of turns, $A_m$=cross sectional area of core based on the ΔB equation. Solving for $A_m = V\tau/2\Delta BN$, the cross sectional area of the core is:

$Am = h(R_o - R_i)(pf)$, where h=height of the core, $R_o$=outer radius, $R_i$=inner radius, pf=packing factor=0.7. The build of the core can be calculated from:

$$w = R_o - R_i = A_m/h/pf$$

The total inductance required for the transfer from $C_{p-1}$ to $C_p$ can be calculated to be $L_{Sp}$. Stray inductance can be a significant factor, and is accommodated by:

$$L_{stray} = L_{Cp-1}$$

and $$L_{sat} = L_{s1} - L_{stray}$$

The saturated inductance for the core can be calculated from:

$L_{sat} = \mu_0 N^2 A_c / <l>$, where $\mu_0 = 4\pi 10^{-7}$, N=number of turns, $A_c$=Cross sectional area of core based on the $L_s$ equation, and $<l>$=mean path length.

Solving for $A_c <l> = L_{sat}/\mu_0 N^2$, $$<l> = 2\pi <R> = 2\pi(R_i + (R_o - R_i)/2) = \pi(R_o + R_i)$$

Setting $A_c = A_m$, $<l>$ can be calculated.

$$(R_o + R_i) = <l>/\pi$$

Core losses can be calculated from:

Loss/Pulse=$Vol$ $H_c \Delta B + (w_t \Delta B)^2/4\square\square$, where Vol=Hπ $((R_o)^2 - (R_i)^2)$, $H_c = 0.22$ A/m from, $w_t$=tape thickness, ρ=material resistivity, τ=charge time.

The compression head 250 also includes a biasing network 312, comprising a biasing poser source 314, similar to those described above and a pair of bias inductors L1 and L2, which biases saturable reactor SR2 310, in order to ensure the user of the full flux swing of the magnetic material. It also allows for a predictable way to bias the cores and ensure predictable operation and timing control. There is also included a circuit 316 including a pair of inductors L3 and L4 connected to ground through a resistor R1, which functions to complete the bias circuit for the reactor. It has the additional function of allowing a path for water cooling directly to the reactor.

Table VIII gives ventilation flow requirements and Table IX gives water cooling requirements.

TABLE VIII

| Ventilation Requirements | |
| --- | --- |
| Ventilation Flow Rate | 50 l/s |
| Recommended Ventilation Flow Rate | 50 l/s |

TABLE IX

| Water Cooling Requirements | |
| --- | --- |
| Water Flow Range | 1–3 l/min. |
| Recommended Water Flow Rate | 2 l/min. |
| Water Temperature | 15–25° C. |
| Water Pressure Static | 618 kPa (75 psig) |
| Water Pressure Delta | 125 kPa (15 psig) |

Table X gives some performance specifications:

TABLE X

| Parameter | Product Specification | Test Definition/Comments |
| --- | --- | --- |
| Inputs | | |
| HV Input Voltage | −18.75 kV to −28.75 kVdc | 750 V to 1150 V Charge Voltage |
| HV Input Current | ≦1050 A | |
| HV Input Capacitance | 9.68 nF +/− 10% | |
| HV Input Charging Time | ≦420 ns | Defined as the time interval between when charging is initiated and when the HV Input Capacitance is charged to the maximum input voltage. The resonant frequency is defined by the resonant charger series inductance and the Commutator HV Input Capacitance. |
| Auxiliary Input Voltage | 5 Vdc +/− 10% | |
| Auxiliary Input Current | ≧5.5 Adc | |
| Maximum Aux. Input Current | 12 Adc | |
| Fan Power | 24 Vdc | |
| Warm-up Time | ≦5 seconds | Defined as the time from the application of auxiliary power to the time the commutator is ready for full voltage, full power operation. |

TABLE X-continued

| Parameter | Product Specification | Test Definition/Comments |
|---|---|---|
| Outputs | | |
| Output Voltage | −18.75 kV to −28.75 kV | |
| Efficiency | 85% | Minimum at maximum power out, assuming no reflected energy |
| Load Capacitance | 11.88 nF +/− 10% | |
| Pulse Repetition Rate | 0–4000 Hz | |
| Output Power | ≦22 kW | |
| Output Pulse Transfer Time | 60 ns resonant charging π/ω transfer time | |
| Output Pulse Transfer Time Jitter | <1 ns | pulse to pulse at all specified repetition rates |

Regarding the HVPS 204 and its interaction with the rest of the SSPPM, the HVPS receives AC power during a 10-second countdown from Laser Off to Standby; receives a HV Enable command from resonant charger 230; and provides DC high voltage to input of resonant charger 230. The HVPS can be water cooled, and housed in a closed chassis with internal air circulation fans.

The resonant charger 230 can receives a program voltage through a high speed HV data serial link to the laser controller 222 over the CAN 280. The RC 212 can issue an HV Enable command to the HVPS 204 and receive input high power DC voltage from the HVPS 204 or modules 204, 204'. The RC 230 can also contains compression head bias power supplies for the respective MO 10 and PO 20 compression heads 250 and 250'. The RC 230 can also charge the $C_0$ capacitor bank 210 (two channels, diode isolated) in the respective commutators 234, 234' precisely to a program voltage level, determined by the LCP 220 as noted above. The RC 230 cam also store reflected energy as current until next charge cycle. The RC can be water and air cooled, e.g., with externally located fans.

The commutators 234, 234', one for the MO and one for the PA, can receive HV charge from a single resonant charger 230, deliver fast HV pulse to compression heads 250, 250' and can be water and air cooled, e.g., with externally located fans.

The compression heads 250, 250', one for the MO and one for PA, can be mounted to top of the respective chamber 10, 20 and can receives fast HV pulses from the respective commutator 234, 234', and provide final pulse compression, and deliver a fast rise time HV pulse to the respective peaking capacitor 320, 320' on the respective chamber 10, 20 for laser discharge.

The HVPS 204 power module can function as a current source to a load capacitance C-1 210 in the RC 230. Multiple HVPS 204 outputs and/or multiple HVPS 204 modules could be employed, e.g., connected in parallel, e.g., to provide the same charge voltage at a higher average power, with equal current sharing. The HVPS 204 power modules can be enabled by a signal from the Resonant Charger 230. The Resonant Charger 230 can receive a LaserON command from the laser controller 222 and enable the HVPS 204 output at the beginning of the ten second countdown from Standby to LaserON.

The HVPS 204 can employ, e.g., power factor correction ("PFC"), as is well known in the power supply field, e.g., to achieve relative immunity to fluctuations in input AC voltage, achieve unity power factor, and eliminate higher harmonics conducted on the input AC lines. The internal DC bus voltage of the HVPS 204 can be roughly regulated by the PFC. Current from the DC bus can alternately be switched through the primary of a step-up transformer (not shown) within the HVPS 204 via an H-bridge inverter (not shown). The AC output of the transformer (not shown) in the HVPS 204 can be rectified to DC. The output current can be monitored by the local control loop (not shown) to maintain controlled output current from the HVPS 204 as long as the output voltage is below some predetermined desired preset output voltage level.

TABLE XI

| Ref. | Characteristic | Criteria |
|---|---|---|
| 8.1.1 | Output Voltage | −800 V (NEGATIVE POLARITY) |
| 8.1.2 | Average Output Power | 30 kW |
| 8.1.3 | Average Output Current | 37.5 A at 30 kW average output power |
| 8.1.4 | Input Voltage | 400 VAC–480 VAC Nominal Tolerance: +/−10% Absolute range: 360 VAC–528 VAC Wye 3-phase +GND (Neutral used in laser frame, but not by HVPS) |
| 8.1.5 | Inrush Current | Less than average operating current over one cycle. |
| 8.1.6 | Minimum Power Factor | 0.95 |
| 8.1.7 | Crest Factor | <2:1 for true load at full output power between any 2 phases |
| 8.1.8 | Turn-on Time (After application of AC power) | 10 seconds maximum |
| 8.1.9 | Charge Time (After assertion of HV Enable) | 5 seconds maximum |

TABLE XI-continued

| Ref. | Characteristic | Criteria |
| --- | --- | --- |
| 8.1.10 | Energy Dump Requirements | HVPS output filter capacitor must discharge to less than 42 V and less than 10 Joules within 8 seconds of shutdown (removal of HV enable or removal of AC power). This requirement may be met through the RC dump circuit. |
| 8.1.11 | Minimum Efficiency | 0.85 |
| 8.1.12 | Load Capacitance | >1000☐F |
| 8.1.13 | Response Time | 100 uS |
| 8.1.14 | Voltage Accuracy | +/−1% |
| 8.1.15 | Voltage Accuracy Drift | 0.5% in 20,000 hours |
| 8.1.16 | Regulation | +/−1% minimum |
| 8.1.17 | Voltage Control | Default −800 V DC Auxiliary voltage control via program potentiometer. Voltage range at least to — 100 V. Specifications 8.1.14, 8.1.15, and 8.1.16 not applicable with auxiliary voltage control. |
| 8.1.18 | Peak Output Current | As required for normal 1% regulation |

At maximum operating voltage of the HVPS 204, 800V, a maximum of 8.3 J of energy can be withdrawn from the load capacitor (not shown), with a capacitance of, e.g., 1033 µF, every 250 µs. The voltage on the load capacitor can be allowed to sag beyond regulation during the discharge pulse to the electrodes, however, the voltage must be restored to within the specified regulation as noted above in Table_, prior to the next discharge pulse. The specified 8.3 J or less may be extracted from the load capacitor in no more than 95 µS. Discharge pulses will occur no less than 250 µS apart. The regulation specification (8.1.17) applies to all operation conditions, 8.3 J or less per pulse, during steady state operation and during initial transient response between first and second pulses, second and third pulses, etc.

The Power Oscillator

The power oscillator 10 shown in FIGS. 1A and 4 is in many ways similar to prior art ArF lasers such as described in the U.S. Pat. No. 5,023,884, entitled COMPACT EXCIMER LASER, the disclosure of which is hereby incorporated by reference and in the above referenced U.S. Pat. No. 6,128,323, and is substantially equivalent to the ArF laser described in the above referenced U.S. patent application Ser. No. 09/854,097. However, improvements over these prior art lasers enable operation at 4000 Hz and greater, as disclosed in U.S. Pat. No. 6,625,191, referenced above, and portions of which are repeated herein for completeness. The power oscillator 10 can, e.g., comprise a discharge chamber 12 in which are located a pair of elongated electrodes (not shown), each of which may be, e.g., about 50 cm long and spaced apart by about 0.5 inch. a fan (not shown) and heat exchanger units (not shown) circulate the laser gas to present fresh, unionized, gas between the electrodes for each gas discharge pulse and remove heat from the chamber. The chamber 12 can include, e.g., window units (not shown), made, e.g., with a high fluence damage tolerant material, e.g., $CaF_2$. The chamber can contain, e.g., a laser gas, e.g., a mixture of 1% xenon, 0.1% of a halogen, e.g., chlorine and the rest neon. The halogen may be inserted in the form of hydrogen chloride, e.g., in the range of 0.03–0.1%, e.g., 0.05%. Xenon may be inserted in the range of, e.g., 0/2%–1%, e.g., 0.3% with the balance made up of neon. Total pressure may be kept, e.g., within the range of 300–500 kPa, e.g., at about 420 kPa. $H_2$ may sometimes be used, e.g., as a catalyst to reverse the loss of HCl, e.g., in amounts in the range of 0.2% to 0.5%. A resonant cavity can be created, e.g., by an output coupler 16 which can also be comprised, e.g., of $CaF_2$ and comprise a mirror, e.g., mounted perpendicular to an output laser pulse beam path direction and be coated to reflect about, e.g., 30% of light at, e.g., 308 nm and to pass about 70% of the 308 nm light. The opposite boundary of the resonant cavity can be formed, e.g., by a totally reflecting mirror 18, which can also be made, e.g., from $CaF_2$.

According to a preferred embodiment of the present invention the main charging capacitor $C_0$ banks 232 for both the power oscillator 10 and the power amplifier 20 may be charged in parallel so as to reduce jitter problems. This can be desirable because the time for pulse compression in the pulse compression circuits 234, 250 of the two pulse power systems 200, respectively for the PO and PA, can be dependent on the level of the charge of the charging capacitor $C_0$ banks 232. Pulse energy output must be controlled on a pulse-to-pulse basis, e.g., by adjustment of the initial charging voltage on the charging capacitor $C_0$ banks 232. Laser gas pressure and $Cl_2$ concentration can also be controlled to achieve desirable beam parameters over a wide range pulse energy increases and laser gas pressure. For a power oscillator 10 according to an embodiment of the present invention, the time between discharge and light-out is a function of $Cl_2$ concentration (0.5 to 1 ns/kPa) so $Cl_2$ concentration may be changed to vary the timing. This can be accounted for by changing fluorine content to maintain a desired concentration as chlorine is depleted as is known in the art, or by using information from preceding pulses to continually update the timing requirement changes due to the slowly depleting chlorine content, as is also well known in the art, similarly to fluorine based lasers.

Power Amplifier

The power amplifier 20 may be comprised, e.g., of a laser chamber 22, which is essentially identical the corresponding power oscillator 10 discharge chamber 12. Having the two separate chambers also facilitates pulse energy and integrated energy in a series of pulses (referred to as dose) control, to a large extent, separately from wavelength and/or bandwidth. This can help to enable, e.g., better dose stability and/or pulse to pulse stability. The two chambers can be operated with substantially the same gas mixture and at substantially the same pressures to optimize oscillation output power in the PO 10 and amplification of the PO 10 output in the Pa 20. All of the components of the chamber are the same and are interchangeable during the manufacturing process.

While the compression heads 250 for the PO and PA are substantially identical, capacitor $C_{p-1}$ banks 272 of the compression head 250 may be more widely positioned for the PO 10 than the PA 20, inorder, e.g., to produce a substantially higher inductance as compared to the PA 20. The close identity of the chambers 12, 22 and the electrical components of the pulse power systems 200 can, e.g., help assure that the timing characteristics of the pulse forming circuits are the same or substantially the same so that jitter problems are minimized.

The power amplifier 20 can be, e.g., configured for at least two beam passages through the discharge region between the electrodes of the PA 20. The PO, being an oscillator with a resonance cavity has a beam that can oscillate several times through the chamber 10 and the rest of the resonant cavity of the PO 10 before emerging as an output laser beam pulse. This beam can then, e.g., be reflected by mirror 14 to the PA 20. as seen in FIG. 1B, the mirror 24 is slightly off of the centerline axis of the chamber 20 and reflects the output laser light pulse beam from the PO through the chamber 20 of the PA at an angle, which may intersect the electrodes (not shown) at generally the mid-point longitudinally of the anode/cathode pair of electrodes (one may be longer than the other, so this mid-point may be determined by the shorter of the two). The beam then exists the rear window of the chamber 20 and enters a beam return unit comprising, e.g., two totally reflecting mirrors 26a and 26b, which can, e.g., reflect the beam back through the chamber 20 of the PA along the longitudinal centerline axis of the discharge, which may corresponds to the longitudinal centerline axis or a discharge region formed by the elongated electrodes and may correspond to the longitudinal centerline axis of the electrodes themselves according to an embodiment of the present invention. The longitudinal centerline axis of the discharge between the electrodes, whether aligned with the longitudinal centerline axis of the electrodes themselves or not, can form the optical axis of the output laser light pulse beam from the PA, through its output coupler 28 and, e.g., a beam monitoring unit 30.

Charging voltages according to an embodiment of the present invention can preferably be selected on a pulse-to-pulse basis to maintain desired pulse and dose energy and stability. $Cl_2$ concentration, e.g., along with other laser operating parameters, e.g., total gas pressure, may be, e.g., monitored and adjusted periodically, in order, e.g., to maintain a desired operating range of charging voltage. This desired range can, e.g., be selected to produce a desired value of dE/dV since the change in energy with voltage can be a function of among other factors, $Cl_2$ concentration and laser gas pressure. The timing of injections according to an embodiment of the present invention can be, e.g., based on charging voltage. The frequency of injections can be, e.g., preferably be high to keep conditions relatively constant and can be, e.g., essentially continuous or nearly continuous, with appropriate adjustments if continuous injection needs to be halted temporarily to maintain desired conditions.

Discharge Timing

The electric discharge between the electrodes in the PO and PA can, e.g., last about 50 ns, resulting from an electrical discharge between the electrodes also of about 50 ns. This discharge creates a population inversion necessary for lasing action but the inversion only exists during the time of the electrical discharge. Therefore, an important requirement for an injection seeded POPA laser system according to an embodiment of the present invention assure that the seed beam from the from the PO 10 passes through discharge region of the PA during the approximately 50 ns of a second when the population is inverted in the laser gas so that amplification of the seed beam can occur. An important obstacle to precise timing of the discharge is the fact that there is a delay, which can be on the order of about 5 microseconds between the time switch 254 is triggered to close (it does not actually close upon being so triggered) and the beginning of the electric discharge, which lasts about 50 ns and causes the gas discharge (resulting in the population inversion) which lasts only about 40–50 ns. It can take this approximately 5 microsecond time interval for the pulse of electrical energy to ring through the circuit between the $C_0$ and the electrodes. This time interval can vary substantially, e.g., depending upon the magnitude of the charging voltage and, e.g., with the temperature of the inductors in the pulse power circuitry 200.

Nevertheless according to embodiments of the present invention, circuitry is provided to enable timing control of the gas discharges of the two discharge chambers 12, 22 to within a relative accuracy of less than about 2 ns. A block diagram of the two circuits are shown in FIG. 8.

According to an embodiment of the present invention applicants have chosen to base certain aspects of timing on a variation with charging voltage by approximately 5–10 ns/volt. According to an embodiment of the present invention, therefore, the measurement and control of the accuracy and repeatability of the high voltage power supply as it charges the charging capacitor $C_0$ banks 232 can be of critical importance. For example, for a timing control of 5 ns, and a shift, e.g., of the sensitivity of 10 ns per volt, resolution accuracy would be required to be 0.5 volts. For a nominal charging voltage of 1000 V, this would require a charging accuracy of 0.05%, which is very difficult to achieve especially when the capacitors must be charged to those specific values 4000 times per second.

Figure 9:
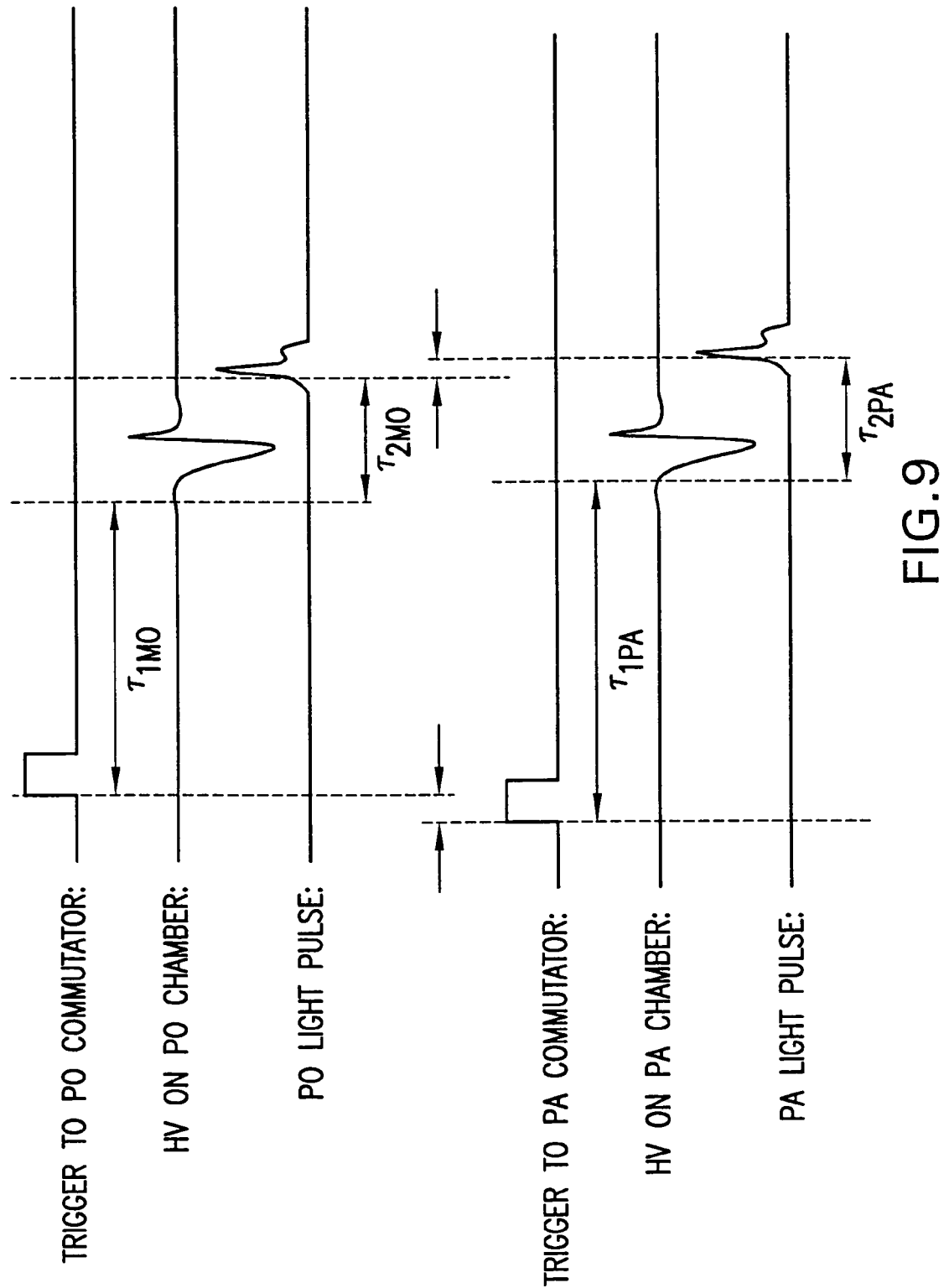

Alternatively, e.g., a solution to this problem, according to an aspect of an embodiment of the present invention can be, e.g., to charge the charging capacitor $C_0$ of both the PO and the PA in parallel from the single resonant charger 230 as indicated in FIGS. 3, 4 and 8 and as described above, so that they are both charged to the same exact voltage and each share the same error from a desired voltage, if any. Also, according to an embodiment of the present invention, the two pulse compression/amplification circuits 234, 250, 242 for the PO 10 and PA 20 are designed so that time delay versus charging voltage curves match as shown in FIG. 9. This can be enabled, e.g., by using to the extent possible the same components in each circuit.

According to an aspect of an embodiment of the present invention minimizing timing variations (the variations are referred to as jitter) the pulse power components for both discharge chambers, e.g., can have essentially identical components so that the time delay versus voltage curves in fact closely track each other as indicated in FIG. 9. Over the normal operating range of charging voltage, there is a substantial change in time delay with voltage but the change with voltage is virtually the same for both circuits. Thus, with both charging capacitors charged in parallel charging voltages can be varied over a wide operating range without changing the relative timing of the discharges. The fact that the pulse power systems are constructed as they are, using magnetic switching that can be carefully biased and predicted in terms of timing, even in the face of other changes than charging voltage, e.g., temperature also can serve to enable enhanced timing control and identity of timing control in the parallel circuits. Also other operating parameters the influence changes in charging voltage, e.g., to maintain output power, change slowly enough that the maintenance of the same relative time delays in each of the parallel pulse power circuits for the PO 10 and PA 20 respectively can also enable maintenance of the same timing of discharges between the chambers over the short term, e.g., pulse to pulse in a burst of pulses and burst to burst over some series of bursts.

Temperature control of electrical components in the pulse power circuit 200 is also important since temperature variations can affect pulse compression timing (especially temperature changes in the saturable inductors). Therefore according to an aspect of the present invention temperature variations in the first instance are minimized, which can be facilitated by the cooling apparatus and techniques discussed in the above referenced application Ser. No. 10/607,407. Additionally, according to an aspect of an embodiment of the present invention the temperature of, e.g., the temperature sensitive components can be monitored and using a feedback control adjustment made to the trigger timing to compensate. Controls can be provided with a processor programmed with a learning algorithm to make adjustments based on historical data relating to past timing variations with known operating histories. This historical data is then applied to anticipate timing changes based on the current operation of the laser system.

Trigger Control

According to an aspect of an embodiment of the present invention the triggering of the electrical discharge (and, therefore also the gas discharge) for each of the two chambers 12, 22, e.g., can be accomplished separately, e.g., utilizing for each circuit a trigger circuit such as one of those described in the above referenced U.S. Pat. No. 6,016,325, part of which is repeated here for completeness. These circuits, e.g., can add timing delays to correct for variations, e.g., in charging voltage and temperature changes in the electrical components of the pulse power system 200, e.g., so that the time between trigger and discharge is held as constant as feasible. As indicated above, since the two circuits are basically the same, the variations after correction are almost equal (i.e., within about 2 ns of each other).

As indicated in FIGS. 6C, D, and E, in the above referenced U.S. Pat. No. 6,625,191, performance of preferred embodiments of the present invention can be greatly enhanced if the electrical discharge in the power amplifier occurs about 40 to 50 ns after the discharge in the master oscillator. Applicants believe that these same relationships will hold relatively the same for a POPA configuration or a POPO configuration according to embodiments of the present invention and/or that the preferred delay can similarly be determined empirically from the same types of measurements exemplified in those Figures. This is believed to be true, e.g., because can take several nanoseconds for the laser pulse to develop in the power oscillator and another several nanoseconds for the front part of the laser beam from the power oscillator to reach the power amplifier. Therefore, according to an aspect of an embodiment of the present invention, separate trigger signals can be provided to the separate trigger switches 254 for each of the charging circuits for the respective PO and PA chambers 12, 22. The actual delay can be chosen to achieve a desired beam quality based on actual performance curves such as those shown in FIGS. 6C, D and E. Variations are also possible as indicated from the measurements reflected in those figures, e.g., longer pulses can be obtained at the expense of, e.g., pulse energy, e.g., by increasing the delay between PO 10 trigger and the PA 20 trigger.

Other Techniques to Control Discharge Timing

Since the relative timing of the discharges can have important effects, e.g., on beam quality, e.g., as indicated in the above referenced FIGS. 6C, D and E graphs, e.g., additional steps may be taken to control discharge timing. For example, if a particular mode of laser operation, e.g., very high power over a very large duty cycle (the ration of the time the laser system is pulsing to the total time when it is pulsing and not pulsing) may result in wide swings in charging voltage and/or wide swings in, e.g., inductor temperature, which could complicate discharge timing control. To address such issues, e.g., the timing of the discharges can be monitored, e.g., on a pulse-to-pulse basis and the time difference, e.g., $t_{amp}-t_{osc}$ can, e.g., be used in a feedback control system to adjust timing of the respective trigger signals closing the respective switches 254. According to an aspect of an embodiment of the present invention a parameter of, e.g., the PA 20 chamber discharge could be monitored, e.g., using a photocell, e.g., to observe a discharge fluorescence (from, e.g., ASE) rather than the laser pulse, since very poor PO 10, PA 20 timing could result in little or no laser beam being produced in the PA 20. For the MO either the ASE or the seed laser pulse could be used to indicate that the MO has provided the necessary energy for the PA to indicate, e.g., that the MO has provided the necessary energy for the Pa. If the MO energy is correct, and the PO energy is low and the ASE is high, one could infer that the time $t_{amp}-t_{osc}$ is not optimum.

According to an aspect of an embodiment of the present invention, also pulse timing can, e.g., be increased or decreased by adjusting the bias currents through the saturable inductors LSA1 and LSA2 in FIG. 5 and/or L1 and L2 or L3 and L4 in FIG. 7, which, e.g., provide bias for inductors LCH in FIGS. 4 and 310 in FIG. 7. Other techniques could be used to increase the time needed to saturate these inductors. For example, the core material can be mechanically separated with a very fast responding PZT element which can be feedback controlled based on a feedback signal from a pulse timing monitor. Further, an adjustable parasitic load could be added to either or both of the pulse power circuits, e.g., downstream of the $C_0$ capacitor banks 210. Charging voltage and inductor temperature signals, in addition to the pulse timing monitor signals, can, e.g., be used in feedback controls to adjust, e.g., the bias currents and/or core mechanical separation as indicated above in addition to the adjustment of the trigger timing as described above.

The length of down times during bursts or between bursts of laser system output light pulses can also affect, e.g., the relative timing between the pulse power systems of the PO 10 and the PA 20 and adjustments may have to be made, e.g., in the trigger control to assure that the discharge in the PA 20 occurs when the seed beam from the MO 10 is at the desired location. By monitoring, e.g., the trigger signals for the electric discharges and the timing of light out from each chamber the laser operator can adjust the trigger timing (accurate to within about 2 ns) to achieve best performance. according to an embodiment of the present invention this can preferably be done by a laser controller 252 having a processor 220 that can be programmed to monitor the timing and beam quality and adjust the timing automatically for best performance, among other things according to the indications of the laser operating parameter signals noted above and the data, e.g., from the empirically derived graphs such as noted above. More specifically timing algorithms which develop sets of bin values applicable to various sets of operating modes and parameters can be utilized according to aspects of an embodiment of the present invention. These algorithms according to aspects of an embodiment of the present invention can be utilized to switch to a feedback control during continuous operation where the timing values for the current pulse is set based on feedback data collected for one or more preceding pulse (such as the immediately preceding pulse), as explained in more detail in the above referenced U.S. Pat. No. 6,067,306.

Alternate Pulse Power Circuit

According to another aspect of an embodiment of the present invention, another pulse power circuit 200 may be considered. This circuit 200 is similar to the one described above, except, e.g., that it can use a higher voltage power supply for charging $C_0$ to a higher value. As in the above described embodiments, a high voltage pulse power supply unit 200, e.g., operating from factory power at, e.g., 230 or 460 volts AC, can be a power source for a fast charging resonant charger 230, as described above and designed for precisely charging two 2.17 µF charging capacitor $C_0$ banks 210, e.g., at frequencies of 4000 Hz and above, to voltages in the range of about 1100 V to 2250 V. The electrical components in the commutator 234 and compression head 250 for the PO 10 can be as identical as feasible to the corresponding components in the PA 20, n order to, e.g., keep time responses in the two circuits as identical as feasible. Switches 254 can be, e.g., banks of two IGBT switches, as shown in FIG. 5 each rated, e.g., at 3300 V and arranged in parallel. The $C_0$ capacitor banks 210 can, e.g., be comprised of 128 0.068 µF 1600 V capacitors, e.g., arranged in 64 parallel legs to provide the 2.17 F $C_0$ bank 210. The $C_1$ capacitor banks 256 can, e.g., be comprised of 136 0.068 µF 1600 V capacitors arranged, e.g., in 68 parallel legs, e.g., to provide a bank capacitance of 2.33 µF. The $C_{p-1}$ and $C_p$ capacitor banks 272, 320 can, e.g., be same as those described above with reference to FIGS. 4 and 5. The saturable inductors 254 can, e.g., be single turn inductors providing saturated inductance of about 3.3 nH, e.g., with five cores, e.g., comprised of 0.5 inch thick 50%—50% Ni—Fe with 4.9 inch OD and 3.8 inch ID. The saturable inductors 270 can, e.g., be two turn inductors providing saturated inductance of about 38 nH each comprised of, e.g., 5 cores, 0.5 inch thick made with 80%–20% Ni—Fe with an OD of 5 inches and an ID of 2.28 inches. Trigger circuits (not shown) can be provided for closing the IGBT's 254 with a timing accuracy of two nanoseconds. The PO 10 can be triggered about 40 ns prior to the triggering of the IGBT 254 for the power amplifier 20. However, the precise timing is preferably determined by feedback signals from sensors which measure the timing of the output of the master oscillator and the power amplifier discharge.

As described earlier, the throughput timing of the magnetic pulse compression in the Pulsed Power system is dependent upon the magnetic material properties that can be a function of the material temperature, etc. In order to maintain precise timing, it is therefore extremely important to either directly or indirectly monitor and/or predict these material properties. One method described previously could utilize temperature monitors along with previously collected data (delay time as a function of temperature) to predict the timing. An alternate approach could utilize the magnetic switch bias circuits to actually measure the magnetic properties (the saturation time) as the magnetics were reverse biased, e.g., in between pulses (or, e.g., prior to the first pulse). The bias circuits could apply sufficient voltage to the magnetic switch to reverse bias the material and at the same time measure the saturation time so that the laser timing could be accurately controlled. Since the volt-second product utilized in reverse biasing the respective switch should be equal to that required during normal discharge operation in the forward direction, the throughput delay time of the pulsed power system, e.g., could be calculated knowing, e.g., the operating voltage of the upcoming pulse.

A schematic diagram of the proposed approach is shown in FIG. 5D of the above referenced '191 patent. Initial operation could, e.g., assume that, e.g., a particular magnetic switch is already saturated in the forward direction, provided by the respective bias power supply, e.g., through the two bias isolation inductors. This current, e.g., could then be interrupted, e.g., by applying, e.g., about. 100V to the magnetic switch which then saturates after about 30 µs. A timer could be triggered, e.g., when the voltage is applied and, e.g., stop counting when a current probe detects saturation of the respective saturable reactor, thus calculating the saturation time for the 100V applied voltage. The respective saturable reactor would be reverse biased and ready for the main pulse discharge sequence, e.g., once residual voltage has been drained from the circuit.

As indicated in the above referenced FIG. 6E, an output pulse length can be in the range of about 20 ns and is to some extent a function of the relative timing of the two electrical discharges. A longer pulse length (other things being equal) can increase the lifetime of optical components of entire manufacturing system including the laser light source system. According to an aspect of an embodiment of the present invention, e.g., several techniques can be used, e.g., to increase pulse length. As indicated above, the relative time between discharges can be optimized for pulse length. The pulse power circuits of both the PO 10 and the PA 20 could be optimized for longer pulses using techniques, e.g., as described in the above referenced U.S. patent application Ser. No. 09/451,995, or with an optical pulse multiplier system such as one of those described in U.S. Pat. No. 6,067,311, which could be added downstream of the PA 20, e.g., to reduce the intensity of individual pulses. The chamber could be made longer and the electrodes could be configured to produce traveling wave discharges designed for longer pulse lengths.

According to an aspect of an embodiment of the present invention, jitter control can be provides, e.g., with technique called a jitter compensation device (JCD), which can, e.g., assures that the pulse timing is accurate within not less than about 10–20 ns. The higher the charging voltage the shorter the delay between trigger and laser pulse. The higher the temperature of the magnetic devices in the pulse power system, the shorter the delay between trigger and pulse. But with a known fixed voltage and temperature, the natural pulse-to-pulse variation of the light pulse with the input trigger is small, about +/−5 ns. Thus, in a preferred embodiment, after a trigger is sent, e.g., by the FCP 252 or the LCP 220, e.g., in response to a trigger command from a user of the light source, e.g., a manufacturing tool, e.g., the LCP, e.g., implementing jitter control, can e.g., delay sending the trigger to the respective solid state switch 254, 254' in the pulse power 200 of the PO 10 and also of the PA 20 laser by an amount corresponding to a signal representative of a sensed laser operating charging voltage and signals representative of sensed temperatures of the magnetics, e.g., so that the timing of the resulting pulse is accurate to within about 20 ns. Alternatively the controller 252 can, e.g., adjust the timing of the electrical pulse for variations in charging voltage based on the specified charging voltage for the upcoming pulse, with no direct correction for temperature variation. However, e.g., a correction can be made to the timing based on a timing error measured from the previous pulse or series of pulses, e.g., within a burst of pulses. Since temperature of the magnetic components usually can be observed to vary slowly, this pulse timing feedback technique, e.g., can, in effect, compensate for slowly varying temperature effects and at the same time provide compensation for other presently more time varying effects.

According to this aspect of an embodiment of the present invention feedback correction can, e.g., be made using a technique, e.g., which applies a full 100% correction for different types of detected timing errors, e.g., for large timing errors such as greater than 20 ns, than for other detected timing errors, e.g., less than the full correction for smaller timing errors, such as, less than 20 ns, e.g., applying a correction of only 25%, or some other smaller correction, which may, e.g., be indexed to the percent of 20 ns represented by the detected timing error factored by some selected correction coefficient is applied. This smaller percentage correction, e.g., can be used to avoid oscillations about a zero error condition in the timing signal. According to another aspect of an embodiment of the present invention a particularly small resolution, e.g., a 1 ns resolution, even within a wide dynamic range may, e.g., be achieved, e.g., using a digital counter with a 40 MHz crystal oscillator. The 40 MHz oscillator can, e.g., provide clock signals, e.g., at 25 ns intervals but these signals can, e.g., be utilized to charge an approximately linear analog capacitive charging circuit. The voltage on the capacitor can then be read to determine time accurate to about 1.0 ns.

It will be understood by those skilled in the art that the present invention according to the disclosed preferred embodiment(s) provides for an XeCl laser particularly well adapted for, e.g., laser crystallization applications. The XeCl laser can be based on existing multi-chambered laser technology having the output of one chamber provide an input to the other, as, e.g., in applicant's assignee's existing products, e.g., the XLA product line. The laser system according to an embodiment of the present invention can be in a POPA configuration or POPO configuration.

In a POPA configuration, a laser system is provided that can operate at very high power and energy (~ near 500 to 1000 W average power). By operating the laser system in a POPA configuration, the overall efficiency could be increased by as much as 50%, which would also improve reliability, because the overall efficiency of use, including cost of consumables is directly related to the length of, at least one of the component consumables, i.e., chamber life. Such a POPA configuration can also improve energy stability, similarly to applicants' assignee's XLA MOPA lasers, because, e.g., the Pa is operated in a saturation regime mode. The laser systems according to embodiments of the present invention are very well suited for, e.g., super lateral growth (SLG) laser crystallization processes where the energy requirements are relatively very high and the stability requirements are relatively very demanding.

The laser system according to embodiments of the present invention, particularly in a POPO configuration, laser can be used to provide two pulses, the timing of which could be separated. The energy of each laser PO chamber could be in the 20 to 30 mJ per pulse range and the rep-rate of each could be up to 4 kHz. For time intervals of ~1 to 2 μsec between pulses, the laser system according to an embodiment of the present invention could be used for advanced SLG ("aSLG"), e.g., as is being proposed by Sumitomo, as discussed in the above referenced Kudo et al. paper. For time intervals between pulses at 125 μsec, the laser system according to an embodiment of the present invention can operates at 8 kHz and, therefore, could be used also for controlled SLG ("cSLG") being developed by numerous labs, as discussed, e.g., in the above referenced Kudo et al. paper and in the above referenced Voutsas paper. Today, both aSLG and cSLG are being considered to be done with high rep-rate green lasers, e.g., diode pumped Nd:YAG frequency doubled lasers, which are not powerful enough and require frequency multiplication.

For cSLG for example, using very short pulse intervals, ~100 ns, the output of the laser system according to an embodiment of the present invention could appear as 2 pulses with a very long pulse width. Such a long pulse, e.g., reduces the solidification time and improves crystal quality. A pulse stretcher could also be used which could improve results for both cSLG and aSLG, because longer pulses are better for, e.g., the crystallization process, e.g., by delaying solidification time in the annealing process, and also protect optics down stream of the laser system. The pulse stretcher could be part of the laser system itself or incorporated into a beam delivery unit external to the laser system. A BDU could also be useful for controlling output laser pulse beam pointing and positioning in delivering the beam to the work station, e.g., for performing SLG, e.g., maintaining these parameters on a pulse to pulse basis.

In another configuration according to an embodiment of the present invention, e.g., as a POPA laser system, the laser system could be operated up to 6 kHz for cSLG. Energy would be reduced, but the power would be >200 W. Also, according to an embodiment of the present invention the output laser light pulse beam can be stretched in one dimension and focused in the other. Such a stretched beam can be sized according to an embodiment of the present invention to, e.g., a slit used in directing the laser light to the work piece and the focused beam's profile can correspond to a Gaussian shape that would be ideal for, e.g., aSLG.

It will be understood by those skilled in the art that similar applications for manufacturing processes involving, e.g., surface or substrate treatment, which for the purposes of this application and the interpretation of the claims will be referred to simply as "surface treatment," and will be understood to cover such processed as induced crystal growth, annealing, enabling, stimulating or enhancing chemical or physical reactions on or in the substrate, and particularly where penetration of the substrate is included, other than simply, e.g., photo-exposing, e.g., a photoresist, e.g., on an integrated circuit wafer, with high power and high stability requirements, may be carried out, as with the above described embodiments of the present invention, but also, e.g., at other center wavelengths, e.g., using XeF, KrF, ArF and F2 gas discharge lasers systems configured according to the above described embodiments of the present invention. An important aspect of the preferred embodiments of the present invention disclosed in the present application is the utilization of the capabilities of applicants multi-chambered POPA and/or POPOI lasers and the ability to precisely control the timing of two lasers chambers acting in a specified manner with each other to solve manufacturing process deficiencies resulting from the use of prior laser systems. Before applicant's assignee's XLA gas discharge lasers in a MOPA, configuration, MOPA or POPA or POPO gas discharge lasers were not commonly in use, due, in part, to these critical timing requirements. Now, however, e.g., with applicant's assignee's XLA technologies, significant enhancement of the utilization of gas discharge lasers, e.g., excimer and molecular fluorine lasers is available, making utilizations for such manufacturing processes as the next generation of large scale poly-silicon crystallization possible. Such laser systems according to aspects of the present invention deliver to a manufacturing work piece very high power (up to 1000 W), very high repetition rate, compared to prior laser systems (500 Hz to 8 KHz depending on the configuration), stretched pulses with energy/power stabilized pulse to pulse and precise pulse timing, including for providing staggered POPO pulses for pulse repetition rate doubling.

It will be understood that embodiments of the present invention can be configured in a variety of beneficial ways, e.g., in a POPA configuration, e.g., for delivering at or above 4 KHz pulse repetition rate 150 mJ and above pulses that are also, e.g, optically stretched, and can also advantageously be improved through delivery in a BDU, or in a double pulsed configuration also employing a POPO with precise (±3 ns) timing and energy control of two pulses (one each from each POPO), or in a POPO configuration also delivering precise (±3 ns) timing and pulse energy for doubled pulses at rates of e.g., 8 KHz, and with pulse stretching and BDU delivery. In the first POPO embodiment, the pulses may be relatively closely spaced, e.g., with a separation of, e.g., $\leq 1$ μs and a separation of, e.g., 250 μs between the start of each first output laser light pulse in the two closely spaced pulses, for an overall pulse repetition rate of 8 KHz. In this event, the second pulse of each pair of closely spaced pulses may be separated by anything less than 125 μs and may also be of a different power level, e.g., a lower power level, e.g., if the processing on the workpiece requires a two step treatment with different power levels spaced more closely together than 125 μs at, e.g., the 8 KHz repetition rate. In the second POPO arrangement the pulses, e.g., can be separated by the uniform 125 μs spacing uniformly for an 8 KHz pulse repetition rate.

Systems according to the present invention utilizing, e.g., XeCl, can provide, e.g., a 308 nm center wavelength 150 mJ per pulse, 4 KHz pulse repetition rate, i.e., 600 W, 1% sigma, 60–70 ns FWHM pulse duration, without stretching, and 120 ns FWHM with a 4× $T_{is}$ stretcher, and having a chamber life on the order of 20 B pulses. SSPPM according to embodiments of the present invention can enable lower maintenance due to longer life, high rep-rate at higher power, longer chamber life and very low inter-chamber jitter. The BDU according to embodiments of the present invention advantageously can provide for improved laser beam shape and reduced divergence at the delivery point to the manufacturing equipment and pointing and positioning actively and dynamically monitored and stabilized in the BDU, independently of laser pointing errors in the light generation, enabling such things as constancy of energy delivery to the manufacturing tool and, thus, also to the work piece.

In summary a gas discharge laser crystallization apparatus and method for performing a transformation of a crystal makeup or orientation in the substrate of a workpiece is disclosed which may comprise, a multichamber laser system comprising, a first laser unit comprising, a first and second gas discharge chamber; each with a pair of elongated spaced apart opposing electrodes contained within the chamber, forming an elongated gas discharge region; a laser gas contained within the chamber comprising a halogen and a noble gas selected to produce laser light at a center wavelength optimized to the crystallization process to be carried out on the workpiece; a power supply module comprising, a DC power source; a first and a second pulse compression and voltage step up circuit connected to the DC power source and connected to the respective electrodes, comprising a multistage fractional step up transformer having a plurality of primary windings connected in series and a single secondary winding passing through each of the plurality of primary windings, and a solid state trigger switch; and a laser timing and control module operative to time the closing of the respective solid state switch based upon operating parameters of the respective first and second pulse compression and voltage step up circuit to effect operation of the first and second laser units as either a POPA configured laser system or a POPO configured laser system to produce a single output laser light pulse beam. As a POPA laser system relay optics may be operative to direct a first output laser light pulse beam from the first laser unit into the second gas discharge chamber; and, the timing and control module operates to create a gas discharge between the second pair of electrodes while the first output laser light pulse beam is transiting the second discharge region, within plus or minus 3 ns and as a POPO, combining optics combine the output beams, and timing creates pulse separation in the combined output a preselected time plus or minus 3 ns. A beam delivery unit and a pulse stretcher may be included, and timing and control may be processor controlled based on signals representing charging voltage and component temperatures in the pulse compression and voltage step up circuits.

The above disclosure refers to presently preferred embodiments of the present invention and the invention should not be considered limited to such embodiments but rather to be in scope commensurate with the appended claims and equivalents of such claims and/r elements recited in such claims.

We claim:

1. A gas discharge laser crystallization apparatus for performing a transformation of a crystal makeup or orientation in the substrate of a workpiece comprising:
   a multichamber laser system comprising:
      a first laser unit comprising:
         a first gas discharge chamber;
         a first pair of elongated spaced apart opposing electrodes contained within the first chamber, forming a first elongated gas discharge region;
         a laser gas contained within the first chamber comprising a halogen and a noble gas selected to produce laser light at a center wavelength optimized to the crystallization process to be carried out on the workpiece;
      a second laser unit comprising:
         a second gas discharge chamber;
         a second pair of elongated spaced apart opposing electrodes contained within the second chamber, forming a second elongated gas discharge region;
         a laser gas contained within the second chamber comprising a halogen and a noble gas selected to produce laser light at a center wavelength optimized to the crystallization process to be carried out on the workpiece, wherein the second laser unit is coupled to the first laser unit such that the laser output of the first laser unit can be double passed through the second gas discharge chamber of the second laser unit;
      a power supply module comprising:
         a DC power source;
         a first pulse compression and voltage step up circuit connected to the DC power source and connected to the first pair of electrodes comprising a multistage fractional step up transformer having a plurality of primary windings connected in series and a single secondary winding passing through each of the plurality of primary windings, and a solid state trigger switch; and a second pulse compression and voltage step up circuit connected to the DC power source and connected to the second pair of electrodes comprising a multistage fractional step up transformer having a plurality of primary windings connected in series and a single secondary winding passing through each of the plurality of primary windings, and a solid state trigger switch; and a laser timing and control module operative to time the closing of the respective solid state switch based upon operating parameters of the respective first and second pulse compression and voltage step up circuit to effect operation of the first and second laser units as either a POPA configured laser system or a POPO configured laser system to produce a single output laser light pulse beam.

2. The apparatus of claim 1 wherein the laser system is configured as a POPA laser system and further comprising:

relay optics operative to direct a first output laser light pulse beam from the first laser unit into the second gas discharge chamber; and, the timing and control module times the closing of the second solid state switch based, in part, upon the time of the closing of the first solid state switch to create a gas discharge between the second pair of electrodes while the first output laser light pulse beam is transiting the second discharge region, within plus or minus 3 ns, to produce a second amplified laser output light pulse beam as the single output laser light pulse beam.

3. The apparatus of claim 1 wherein the laser system is configured as a POPO laser system and further comprising:

combining optics operative to combine a first output laser light pulse beam from the first laser unit with a second output laser light pulse beam from the second laser unit to produce the single output laser light pulse beam; and the timing and control module times the closing of the second solid state switch based, in part, upon the time of the closing of the first solid state switch to create a gas discharge between the second pair of electrodes to separate an output laser light pulse in the first output laser light pulse beam from an output laser light pulse in the second output laser light pulse beam in the single output laser light pulse beam by a preselected time plus or minus 3 ns.

4. The apparatus of claim 1, further comprising:
a pulse stretcher in the path of the single output laser light pulse beam operative to stretch the $T_{is}$ of the pulses in the single output laser light pulse beam by at least 2×.

5. The apparatus of claim 2, further comprising:
a pulse stretcher in the path of the single output laser light pulse beam operative to stretch the $T_{is}$ of the pulses in the single output laser light pulse beam by at least 2×.

6. The apparatus of claim 3, further comprising:
a pulse stretcher in the path of the single output laser light pulse beam operative to stretch the $T_{is}$ of the pulses in the single output laser light pulse beam by at least 2×.

7. The apparatus of claim 1, further comprising:
a beam delivery unit in the path of the single output laser light pulse beam and operative to deliver the single output laser light pulse beam to a manufacturing tool for the performance of the transformation of the crystal makeup or orientation in the substrate of the workpiece; and, a beam adjustment module within the beam delivery unit comprising a beam parameter monitor and a beam parameter adjustment mechanism.

8. The apparatus of claim 2, further comprising:
a beam delivery unit in the path of the single output laser light pulse beam and operative to deliver the single output laser light pulse beam to a manufacturing tool for the performance of the transformation of the crystal makeup or orientation in the substrate of the workpiece; and, a beam adjustment module within the beam delivery unit comprising a beam parameter monitor and a beam parameter adjustment mechanism.

9. The apparatus of claim 3, further comprising:
a beam delivery unit in the path of the single output laser light pulse beam and operative to deliver the single output laser light pulse beam to a manufacturing tool for the performance of the transformation of the crystal makeup or orientation in the substrate of the workpiece; and, a beam adjustment module within the beam delivery unit comprising a beam parameter monitor and a beam parameter adjustment mechanism.

10. The apparatus of claim 4, further comprising:
a beam delivery unit in the path of the single output laser light pulse beam and operative to deliver the single output laser light pulse beam to a manufacturing tool for the performance of the transformation of the crystal makeup or orientation in the substrate of the workpiece; and, a beam adjustment module within the beam delivery unit comprising a beam parameter monitor and a beam parameter adjustment mechanism.

11. The apparatus of claim 5, further comprising:
a beam delivery unit in the path of the single output laser light pulse beam and operative to deliver the single output laser light pulse beam to a manufacturing tool for the performance of the transformation of the crystal makeup or orientation in the substrate of the workpiece; and, a beam adjustment module within the beam delivery unit comprising a beam parameter monitor and a beam parameter adjustment mechanism.

12. The apparatus of claim 6, further comprising:
a beam delivery unit in the path of the single output laser light pulse beam and operative to deliver the single output laser light pulse beam to a manufacturing tool for the performance of the transformation of the crystal makeup or orientation in the substrate of the workpiece; and, a beam adjustment module within the beam delivery unit comprising a beam parameter monitor and a beam parameter adjustment mechanism.

13. The apparatus of claim 7 further comprising:
the timing and control module comprises a processor performing a programmed timing control operation based upon received signals representative of the charging voltage in the respective first and second pulse compression and voltage step up circuits and signals representative of the temperature of at least one magnetic switching element in the respective first and second pulse compression and voltage step up circuit.

14. The apparatus of claim 8 further comprising:
the timing and control module comprises a processor performing a programmed timing control operation based upon received signals representative of the charging voltage in the respective first and second pulse compression and voltage step up circuits and signals representative of the temperature of at least one magnetic switching element in the respective first and second pulse compression and voltage step up circuit.

15. The apparatus of claim 9 further comprising:
the timing and control module comprises a processor performing a programmed timing control operation based upon received signals representative of the charging voltage in the respective first and second pulse compression and voltage step up circuits and signals representative of the temperature of at least one magnetic switching element in the respective first and second pulse compression and voltage step up circuit.

16. The apparatus of claim 10 further comprising:
the timing and control module comprises a processor performing a programmed timing control operation based upon received signals representative of the charging voltage in the respective first and second pulse compression and voltage step up circuits and signals representative of the temperature of at least one magnetic switching element in the respective first and second pulse compression and voltage step up circuit.

17. The apparatus of claim 11 further comprising:
the timing and control module comprises a processor performing a programmed timing control operation based upon received signals representative of the charging voltage in the respective first and second pulse compression and voltage step up circuits and signals representative of the temperature of at least one magnetic switching element in the respective first and second pulse compression and voltage step up circuit.

18. The apparatus of claim 12 further comprising:
the timing and control module comprises a processor performing a programmed timing control operation based upon received signals representative of the charging voltage in the respective first and second pulse compression and voltage step up circuits and signals representative of the temperature of at least one magnetic switching element in the respective first and second pulse compression and voltage step up circuit.

19. A gas discharge laser crystallization means for performing a transformation of a crystal makeup or orientation in the substrate of a workpiece comprising:
a multichamber laser system comprising:
a first laser unit comprising;
  a first gas discharge chamber;
  a first pair of elongated spaced apart opposing electrodes contained within the first chamber, forming a first elongated gas discharge region;
  a laser gas contained within the first chamber comprising a halogen and a noble gas selected to produce laser light at a center wavelength optimized to the crystallization process to be carried out on the workpiece;
a second laser unit comprising:
a second gas discharge chamber;
  a second pair of elongated spaced apart opposing electrodes contained within the second chamber, forming a second elongated gas discharge region;
  a laser gas contained within the second chamber comprising a halogen and a noble gas selected to produce laser light at a center wavelength optimized to the crystallization process to be carried out on the workpiece, wherein the second laser unit is coupled to the first laser unit such that the laser output of the first laser unit can be double passed through the second gas discharge chamber of the second laser unit;
a power supply means comprising;
  a DC power source;
  a first pulse compression and voltage step up means connected to the DC power source and connected to the first pair of electrodes comprising a multistage fractional step up transformer having a plurality of primary windings connected in series and a single secondary winding passing through each of the plurality of primary windings, and a solid state trigger switch; and
  a second pulse compression and voltage step up means connected to the DC power source and connected to the second pair of electrodes comprising a multistage fractional step up transformer having a plurality of primary windings connected in series and a single secondary winding passing through each of the plurality of primary windings, and a solid state trigger switch; and
a laser timing and control means for timing the closing of the respective solid slate switch based upon operating parameters of the respective first and second pulse compression and voltage step up means for effecting operation of the first and second laser units as either a POPA configured laser system or a POPO configured laser system to produce a single output laser light pulse beam.

20. The apparatus of claim 19 wherein the laser system is configured as a POPA laser system and further comprising:
relay optics means for directing a first output laser light pulse beam from the first laser unit into the second gas discharge chamber; and,
the timing and control means including means for timing the closing of the second solid state switch based, in part, upon the time of the closing of the first solid state switch to create a gas discharge between the second pair of electrodes while the first output laser light pulse beam is transiting the second discharge region, within plus or minus 3 ns, for producing a second amplified laser output light pulse beam as the single output laser light pulse beam.

21. The apparatus of claim 19 wherein the laser system is configured as a POPO laser system and further comprising:
combining optic means for combining a first output laser light pulse beam from the first laser unit with a second output laser light pulse beam from the second laser unit to produce the single output laser light pulse beam; and
the timing and control means including means for timing the closing of the second solid state switch based, in part, upon the time of the closing of the first solid state switch for creating a gas discharge between the second pair of electrodes to separate an output laser light pulse in the first output laser light pulse beam from an output laser light pulse in the second output laser light pulse beam in the single output laser light pulse beam by a preselected time plus or minus 3 ns.

22. The apparatus of claim 19, further comprising:
a pulse stretching means in the path of the single output laser light pulse beam for stretching the $T_{is}$ of the pulses in the single output laser light pulse beam by at least 2×.

23. The apparatus of claim 20, further comprising:
a pulse stretching means in the path of the single output laser light pulse beam for stretching the $T_{is}$ of the pulses in the single output laser light pulse beam by at least 2×.

24. The apparatus of claim 21, further comprising:
a pulse stretching means in the path of the single output laser light pulse beam for stretching the $T_{is}$ of the pulses in the single output laser light pulse beam by at least 2×.

25. The apparatus of claim 19, further comprising:
a beam delivery unit means in the path of the single output laser light pulse beam for delivering the single output laser light pulse beam to a manufacturing tool for the performance of the transformation of the crystal makeup or orientation in the substrate of the workpiece; and,
a beam adjustment means within the beam delivery unit means comprising a beam parameter monitoring means and a beam parameter adjustment means.

26. The apparatus of claim 20, further comprising:
a beam delivery unit means in the path of the single output laser light pulse beam for delivering the single output laser light pulse beam to a manufacturing tool for the performance of the transformation of the crystal makeup or orientation in the substrate of the workpiece; and,
a beam adjustment means within the beam delivery unit means comprising a beam parameter monitoring means and a beam parameter adjustment means.

27. The apparatus of claim 21, further comprising:
a beam delivery unit means in the path of the single output laser light pulse beam for delivering the single output laser light pulse beam to a manufacturing tool for the performance of the transformation of the crystal makeup or orientation in the substrate of the workpiece; and,
a beam adjustment means within the beam delivery unit means comprising a beam parameter monitoring means and a beam parameter adjustment means.

28. The apparatus of claim 22, further comprising:
a beam delivery unit means in the path of the single output laser light pulse beam for delivering the single output laser light pulse beam to a manufacturing tool for the performance of the transformation of the crystal makeup or orientation in the substrate of the workpiece; and,
a beam adjustment means within the beam delivery unit means comprising a beam parameter monitoring means and a beam parameter adjustment means.

29. The apparatus of claim 23, further comprising:
a beam delivery unit means in the path of the single output laser light pulse beam for delivering the single output laser light pulse beam to a manufacturing tool for the performance of the transformation of the crystal makeup or orientation in the substrate of the workpiece; and,
a beam adjustment means within the beam delivery unit means comprising a beam parameter monitoring means and a beam parameter adjustment means.

30. The apparatus of claim 24, further comprising:
a beam delivery unit means in the path of the single output laser light pulse beam for delivering the single output laser light pulse beam to a manufacturing tool for the performance of the transformation of the crystal makeup or orientation in the substrate of the workpiece; and,
a beam adjustment means within the beam delivery unit means comprising a beam parameter monitoring means and a beam parameter adjustment means.

31. The apparatus of claim 25 further comprising:
the timing and control means comprises a processor means for performing a programmed timing and control operation based upon received signals representative of the charging voltage in the respective first and second pulse compression and voltage step up means and signals representative of the temperature of at least one magnetic switching element in the respective first and second pulse compression and voltage step up means.

32. The apparatus of claim 26 further comprising:
the timing and control means comprises a processor means for performing a programmed timing and control operation based upon received signals representative of the charging voltage in the respective first and second pulse compression and voltage step up means and signals representative of the temperature of at least one magnetic switching element in the respective first and second pulse compression and voltage step up means.

33. The apparatus of claim 27 further comprising:
the timing and control means comprises a processor means for performing a the charging voltage in the respective first and second pulse compression and voltage step up means and signals representative of the temperature of at least one magnetic switching element in the respective first and second pulse compression and voltage step up means.

34. The apparatus of claim 28 further comprising:
the timing and control means comprises a processor means for performing a programmed timing and control operation based upon received signals representative of the charging voltage in the respective first and second pulse compression and voltage step up means and signals representative of the temperature of at least one magnetic switching element in the respective first and second pulse compression and voltage step up means.

35. The apparatus of claim 29 further comprising:
the timing and control means comprises a processor means for performing a programmed timing and control operation based upon received signals representative of the charging voltage in the respective first and second pulse compression and voltage step up means and signals representative of the temperature of at least one magnetic switching element in the respective first and second pulse compression and voltage step up means.

36. The apparatus of claim 30 further comprising:
the timing and control means comprises a processor means for performing a programmed timing and control operation based upon received signals representative of the charging voltage in the respective first and second pulse compression and voltage step up means and signals representative of the temperature of at least one magnetic switching element in the respective first and second pulse compression and voltage step up means.

37. A method for performing a transformation of a crystal makeup or orientation in the substrate of a workpiece using a gas discharge laser comprising:
using a multichamber laser system comprising:
a first laser unit comprising:
a first gas discharge chamber;
a first pair of elongated spaced apart opposing electrodes contained within the first chamber, forming a first elongated gas discharge region;
a laser gas contained within the first chamber comprising a halogen and a noble gas selected to produce laser light at a center wavelength optimized to the crystallization process to be carried out on the workpiece;

a second laser unit comprising:
  a second gas discharge chamber;
  a second pair of elongated spaced apart opposing electrodes contained within the second chamber, forming a second elongated gas discharge region:
  a laser gas contained within the second chamber comprising a halogen and a noble gas selected to produce laser light at a center wavelength optimized to the crystallization process to be carried out on the workpiece, wherein the second laser unit is coupled to the first laser unit such that the laser output of the first laser unit can be double passed through the second gas discharge chamber of the second laser unit;
a power supply means comprising:
  a DC power source;
  a first pulse compression and voltage step up means connected to the DC power source and connected to the first pair of electrodes comprising a multistage fractional step up transformer having a plurality of primary windings connected in series and a single secondary winding passing through each of the plurality of primary windings, and a solid state trigger switch; and
  a second pulse compression and voltage step up means connected to the DC power source and connected to the second pair of electrodes comprising a multistage fractional step up transformer having a plurality of primary windings connected in series and a single secondary winding passing through each of the plurality of primary windings, and a solid state trigger switch; and
  timing the closing of the respective solid state switch based upon operating parameters of the respective first and second pulse compression and voltage step up means for effecting operation of the first and second laser units as either a POPA configured laser system or a POPO configured laser system to produce a single output laser light pulse beam.

38. The method of claim 37 wherein the laser system is configured as a POPA laser system and further comprising:
  directing a first output laser light pulse beam from the first laser unit into the second gas discharge chamber; and,
  timing the closing of the second solid state switch based, in part, upon the time of the closing of the first solid state switch to create a gas discharge between the second pair of electrodes while the first output laser light pulse beam is transiting the second discharge region, within plus or minus 3 ns, for producing a second amplified laser output light pulse beam as the single output laser light pulse beam.

39. The method of claim 37 wherein the laser system is configured as a POPO laser system and further comprising:
  combining a first output laser light pulse beam from the first laser unit with a second output laser light pulse beam from the second laser unit to produce the single output laser light pulse beam; and
  timing the closing of the second solid state switch based, in part, upon the time of the closing of the first solid state switch for creating a gas discharge between the second pair of electrodes to separate an output laser light pulse in the first output laser light pulse beam from an output laser light pulse in the second output laser light pulse beam in the single output laser light pulse beam by a preselected time plus or minus 3 ns.

40. The method of claim 37, further comprising:
stretching the $T_{is}$ of the pulses in the single output laser light pulse beam by at least 2×.

41. The method of claim 38, further comprising:
stretching the $T_{is}$ of the pulses in the single output laser light pulse beam by at least 2×.

42. The method of claim 39, further comprising:
stretching the $T_{is}$ of the pulses in the single output laser light pulse beam by at least 2×.

43. The method of claim 37, further comprising:
using a beam delivery unit in the path of the single output laser light pulse beam delivering the single output laser light pulse beam to a manufacturing tool for the performance of the transformation of the crystal makeup or orientation in the substrate of the workpiece; and,
using a beam adjustment mechanism within the beam delivery unit comprising a beam parameter monitoring means and a beam parameter adjustment means to monitor and adjust a beam parameter.

44. The method of claim 38, further comprising:
using a beam delivery unit in the path of the single output laser light pulse beam delivering the single output laser light pulse beam to a manufacturing tool for the performance of the transformation of the crystal makeup or orientation in the substrate of the workpiece; and,
using a beam adjustment mechanism within the beam delivery unit comprising a beam parameter monitoring means and a beam parameter adjustment means to monitor and adjust a beam parameter.

45. The method of claim 39, further comprising:
using a beam delivery unit in the path of the single output laser light pulse beam delivering the single output laser light pulse beam to a manufacturing tool for the performance of the transformation of the crystal makeup or orientation in the substrate of the workpiece; and,
using a beam adjustment mechanism within the beam delivery unit comprising a beam parameter monitoring means and a beam parameter adjustment means to monitor and adjust a beam parameter.

46. The method of claim 40, further comprising:
using a beam delivery unit in the path of the single output laser light pulse beam delivering the single output laser light pulse beam to a manufacturing tool for the performance of the transformation of the crystal makeup or orientation in the substrate of the workpiece; and,
using a beam adjustment mechanism within the beam delivery unit comprising a beam parameter monitoring means and a beam parameter adjustment means to monitor and adjust a beam parameter.

47. The method of claim 41, further comprising:
using a beam delivery unit in the path of the single output laser light pulse beam delivering the single output laser light pulse beam to a manufacturing tool for the performance of the transformation of the crystal makeup or orientation in the substrate of the workpiece; and,
using a beam adjustment mechanism within the beam delivery unit comprising a beam parameter monitoring means and a beam parameter adjustment means to monitor and adjust a beam parameter.

48. The method of claim 42, further comprising:
using a beam delivery unit in the path of the single output laser light pulse beam delivering the single output laser light pulse beam to a manufacturing tool for the performance of the transformation of the crystal makeup or orientation in the substrate of the workpiece; and,
using a beam adjustment mechanism within the beam delivery unit comprising a beam parameter monitoring means and a beam parameter adjustment means to monitor and adjust a beam parameter.

49. The method of claim 37 further comprising:

performing a programmed timing and control operation based upon received signals representative of the charging voltage in the respective first and second pulse compression and voltage step up circuits and signals representative of the temperature of at least one magnetic switching element in the respective first and second pulse compression and voltage step up circuit.

50. The method of claim 38 further comprising:

performing a programmed timing and control operation based upon received signals representative of the charging voltage in the respective first and second pulse compression and voltage step up circuits and signals representative of the temperature of at least one magnetic switching element in the respective first and second pulse compression and voltage step up circuit.

51. The method of claim 39 further comprising:

performing a programmed timing and control operation based upon received signals representative of the charging voltage in the respective first and second pulse compression and voltage step up circuits and signals representative of the temperature of at least one magnetic switching element in the respective first and second pulse compression and voltage step up circuit.

52. The method of claim 40 further comprising:

performing a programmed timing and control operation based upon received signals representative of the charging voltage in the respective first and second pulse compression and voltage step up circuits and signals representative of the temperature of at least one magnetic switching element in the respective first and second pulse compression and voltage step up circuit.

53. The method of claim 41 further comprising:

performing a programmed timing and control operation based upon received signals representative of the charging voltage in the respective first and second pulse compression and voltage step up circuits and signals representative of the temperature of at least one magnetic switching element in the respective first and second pulse compression and voltage step up circuit.

54. The method of claim 42 further comprising:

performing a programmed timing and control operation based upon received signals representative of the charging voltage in the respective first and second pulse compression and voltage step up circuits and signals representative of the temperature of at least one magnetic switching element in the respective first and second pulse compression and voltage step up circuit.

* * * * *

UNITED STATES PATENT AND TRADEMARK OFFICE
CERTIFICATE OF CORRECTION

PATENT NO. : 7,167,499 B2
APPLICATION NO. : 10/781251
DATED : January 23, 2007
INVENTOR(S) : Das et al.

It is certified that error appears in the above-identified patent and that said Letters Patent is hereby corrected as shown below:

Column 40, Line 20, delete the word "slate" and insert in lieu thereof the word -- state --

Column 42, Line 16, in-between the words "a" and "the", insert the text -- programmed timing and control operation based upon received signals representative of --

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,167,499 B2
APPLICATION NO. : 10/781251
DATED : January 23, 2007
INVENTOR(S) : Palash P. Das et al.

It is certified that error appears in the above-identified patent and that said Letters Patent is hereby corrected as shown below:

Column 35, Line 17, replace the first occurrence of the word "POPO" with the word --PO--

Signed and Sealed this
Twenty-seventh Day of March, 2012

David J. Kappos
*Director of the United States Patent and Trademark Office*